United States Patent [19]

Siebert et al.

[11] Patent Number: 5,280,068

[45] Date of Patent: Jan. 18, 1994

[54] EPOXY RESIN SYSTEMS MODIFIED WITH LOW VISCOSITY STATISTICAL MONOFUNCTIONAL REACTIVE POLYMERS

[75] Inventors: Alan R. Siebert, Orange Village; Robert J. Bertsch, Brecksville, both of Ohio

[73] Assignee: The B.F. Goodrich Company, Akron, Ohio

[21] Appl. No.: 888,583

[22] Filed: May 26, 1992

Related U.S. Application Data

[60] Division of Ser. No. 671,981, Mar. 22, 1991, Pat. No. 5,140,068, which is a continuation-in-part of Ser. No. 515,794, Apr. 27, 1990, Pat. No. 5,157,077, which is a continuation-in-part of Ser. No. 515,793, Apr. 27, 1990, Pat. No. 5,053,496.

[51] Int. Cl.$^5$ ............... C08F 8/08; C08G 65/02; C08G 8/30

[52] U.S. Cl. ............... 525/108; 525/113; 525/114; 525/118; 525/119; 525/120; 525/121; 525/122; 525/502; 528/103; 528/111; 528/112; 528/113; 528/114; 528/115; 528/120; 528/123; 528/393

[58] Field of Search ............... 525/108, 113, 114, 118, 525/119, 120, 121, 122, 502; 528/103, 111, 112, 113, 114, 115, 120, 123, 393

[56] References Cited

U.S. PATENT DOCUMENTS

| | | |
|---|---|---|
| 2,566,573 | 8/1951 | Pease et al. . |
| 2,586,995 | 2/1952 | Robertson . |
| 3,285,949 | 11/1966 | Siebert . |
| 3,465,058 | 9/1969 | McCarthy ............... 528/112 |
| 3,466,302 | 9/1969 | Shulman et al. ............... 528/112 |
| 3,823,107 | 7/1974 | Cotton . |
| 4,039,527 | 8/1977 | Nagaoka et al. . |
| 4,045,427 | 8/1977 | Sheppard et al. . |
| 4,075,286 | 2/1987 | MacLeay et al. . |
| 4,684,717 | 8/1987 | Ashitaka et al. . |
| 5,053,446 | 10/1991 | Bertsch et al. ............... 524/190 |
| 5,140,068 | 8/1992 | Siebert et al. ............... 528/113 |

FOREIGN PATENT DOCUMENTS

| | | |
|---|---|---|
| 0224411 | 12/1990 | European Pat. Off. . |
| 2118333 | 10/1972 | Fed. Rep. of Germany . |
| 662483 | 2/1965 | France . |
| 2128773 | 10/1972 | France . |
| 1349569 | 4/1974 | United Kingdom . |

OTHER PUBLICATIONS

An article entitled "The Chemistry of Rubber-Toughened Epoxy Resins", by A. R. Siebert and C. K. Riew PCT International Search Report Sep. 12, 1991.

*Primary Examiner*—John Kight, III
*Assistant Examiner*—John M. Cooney, Jr.
*Attorney, Agent, or Firm*—Debra L. Pawl; George W. Moxon, II

[57] ABSTRACT

Curable epoxy resins are toughened with statistical monofunctional carboxyl, amine or epoxy terminated reactive polymers and have low viscosities before cure thereby making them useful in a wide range of applications. The cured epoxy resin systems which are modified by the statistical monofunctional reactive polymers have physical properties, such as adhesion and elongation, generally equal to or better than those of cured epoxy resin systems modified with statistical difunctional reactive polymers. A process of preparation for the modified epoxy resin systems of the present invention includes admixing an epoxy resin with a statistical monofunctional carboxyl, amine, or epoxy-terminated reactive polymer in the presence of a curing agent and reaction therewith to form the toughened, cured epoxy resin system.

9 Claims, 1 Drawing Sheet

EPOXY RESIN SYSTEMS MODIFIED WITH LOW VISCOSITY STATISTICAL MONOFUNCTIONAL REACTIVE POLYMERS

CROSS REFERENCES

This is a division of pending application Ser. No. 07/671,981 filed Mar. 22, 1991, U.S. Pat. No. 5,140,068, which is a Continuation-In-Part of U.S. Ser. No. 07/515,794 filed Apr. 27, 1990, U.S. Pat. No. 5,157,077 for "Epoxy Resin Systems Modified with Statistical Monofunctional Reactive Polymers" and U.S. Ser. No. 07/515,793 filed Apr. 27, 1990 U.S. Pat. No. 5,053,996 for "Low Viscosity Monofunctional Carboxylic-Terminated, Amine-Terminated, or Epoxy-Terminated Reactive Liquid rubber Polymers, and process For Preparation Thereof".

FIELD OF THE INVENTION

The present invention generally relates to modified epoxy resin systems. More particularly, in one aspect the invention relates to epoxy resins which are modified with low viscosity statistical monofunctional carboxyl, amine, or epoxy-terminated reactive polymers to provide a cured epoxy resin without adversely effecting other physical properties of the epoxy resin. In another aspect, the invention relates to a process of preparation of the modified epoxy resins.

BACKGROUND ART

The ability of a brittle or thermoset epoxy resin to absorb energy without catastrophic failure can be increased through flexibilizing or toughening. Such flexibilizing and toughening may be accomplished by reacting or compounding the epoxy resin with an elastomer thereby enhancing the resin system's ability to resist mechanical and thermal stress. Such elastomers are known and include reactive liquid polymers such as dicarboxyl-terminated polymers as exemplified by U.S. Pat. No. 3,285,949, and diamine-terminated polymers as disclosed in U.S. Pat. No. 3,823,107. It is also known that liquid dicarboxyl-terminated polymers have the advantage of a material which is pourable and castable at room temperature and because of the reactive functional chain ends it can be further reacted at elevated temperatures by the addition of polyamines or diepoxies to form the liquid diamine or diepoxy terminated polymers. Such liquid elastomers have found a wide variety of utility, but are particularly useful as toughening agents in sealants, caulk, adhesive and potting epoxy resin systems. In fact, heretofore it was believed that difunctionality of these elastomers was essential to achieving desirable physical properties of the resins incorporating the elastomers. This thinking is typified by U.S. Pat. Nos. 3,285,949 and 3,823,107, and the article "The Chemistry of Rubber Toughened Epoxy Resins I." by A. R. Siebert and C. K. Riew. Improvements in such properties as the impact strength and crack resistance of resins incorporating carboxyl, amine, and epoxy-terminated polymers have been attributed to their difunctional character. The terminal carboxyl, amine, or epoxy functionality at or close to two was believed to be essential to achieving maximum toughness, and therefore polymers having lesser functionality were thought to be unsuitable.

SUMMARY OF THE INVENTION

The present invention relates to incorporating a low viscosity statistical monofunctional carboxyl, amine, or epoxy-terminated reactive liquid polymer into an epoxy resin system as by reaction therewith. Moreover, such low viscosity statistical monofunctional reactive liquid polymers, while also satisfactorily toughening the epoxy resins into which they are incorporated upon cure, have viscosity values which are significantly less than that of related statistical difunctional carboxyl, amine, and epoxy-terminated polymers. Thus, the statistical monofunctional polymers are desirable for uses not before possible with the more viscous difunctional polymers, such as ambient temperature applications. The low viscosity statistical monofunctional carboxyl, amine, and epoxy-terminated reactive liquid polymers and processes of preparation thereof are described hereinbelow and generally relate to toughening either a one-part or two-part epoxy resin system.

DETAILED DESCRIPTION

Figure 1:
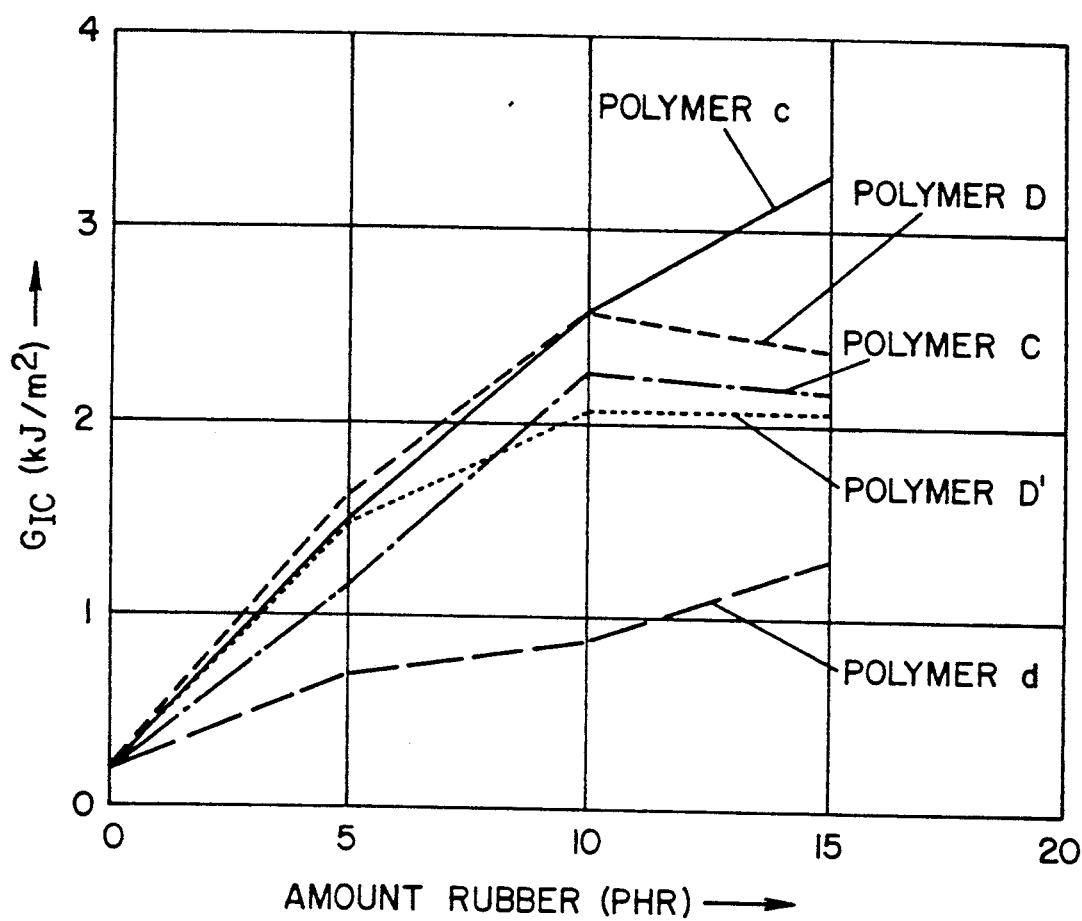
FIG. 1 is a graph showing a comparison of fracture energy of several butadiene/acrylonitrile copolymers plotted against the rubber content of the copolymers.

The present invention generally relates to epoxy resins which are modified with low viscosity statistical monofunctional carboxyl, amine, or epoxy-terminated reactive liquid polymers to provide toughened cured epoxy resins having physical properties which are generally equal to or better than those of epoxy resins that are modified with similar difunctional reactive liquid polymers It is to be understood that the term "statistical monofunctional" used for describing the reactive liquid polymers of the present invention, means that the rubber or elastomer is regarded, statistically, as having 100 percent monofunctional end groups. However, the statistical monofunctional rubber may include difunctional, non-functional and monofunctional species, or alternatively, only difunctional and non-functional species, as will be described in greater detail below. The following general structural formulas 1, 2 and 3 represent the toughened epoxy resin systems of the present invention as modified by the statistical monofunctional carboxyl, amine and epoxy-terminated reactive liquid polymers, respectively:

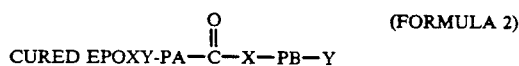

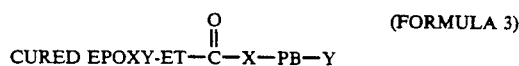

wherein —Y represents a non-reactive terminus of the reactive polymer, —PB— represents a carbon-carbon backbone of the polymer, -X- represents an initiator fragment, and CURED EPOXY represents a cured epoxy resin in each FORMULA 1 to 3, and further wherein PA represents a polyamine in FORMULA 2 and ET represents an epoxy resin in FORMULA 3. The present invention further relates to a process of preparation of these modified epoxy resins.

It is to be understood that hereinafter the term "epoxy resin terminator" will be used to refer to the dyl ether of bisphenol A (DGEBA) which has the following structural formula:

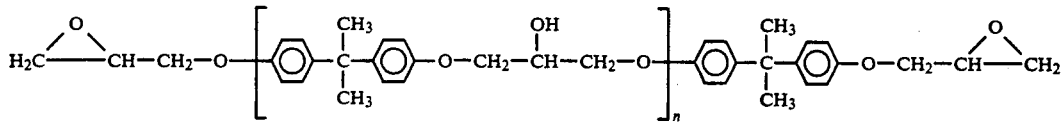

epoxy resin end cap for the statistical monofunctional epoxy-terminated reactive polymer, and the term "epoxy resin" will be used to refer to the epoxy resin which is modified by the statistical monofunctional reactive polymers.

In general, an epoxy resin is a compound containing more than one α or 1,2-epoxy group which is designated by the structural formula:

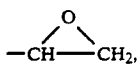

and which is capable of being converted to a useful thermoset or cured state by an amine curing agent as discussed hereinbelow, whether such α-epoxy group is situated internally, terminally, or on cyclic structures.

Epoxy resins which are suitable for use in the present invention include many commercially available epoxy resins and preferably diepoxy resins which are well-known to the art and to the literature. Desirable epoxy resins include polyhydric phenol polyether alcohols; glycidyl ethers of novolac resins such as epoxylated phenol-formaldehyde novolac resin; glycidyl ethers of mononuclear di- and trihydric phenols; glycidyl ethers of bisphenols such as diglycidyl ether of tetrabromobisphenol A; glycidyl ethers of polynuclear phenols; epoxy resin from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2,3-epoxypropyl)methylpropylammonium p-toluenesulfonate; and glycidyl triazines; thioglycidyl resins such as epoxidized bisulfide; silicon-glycidyl resins such as 1,4-bis[(2,3-epoxypropoxy)dimethylsilyl]; fluorine glycidyl resins; epoxy resins which are synthesized from monoepoxies other than epihalohydrins including epoxy resins from unsaturated monoepoxies such as polyallyl glycidyl ether and glycidyl sorbate dimer; epoxy resins from monoepoxy alcohols; epoxy resins from monoepoxies by ester interchange; epoxy resins from glycidaldehyde; polyglycidyl compounds containing unsaturation such as allyl-substituted diglycidyl ether of bisphenol A; epoxy resins which are synthesized from olefins and chloroacetyls such as butadiene dioxide, vinylcyclohexene dioxide, epoxidized polybutadiene, and bis(2,3-epoxy-cyclopentyl)ether; and epoxy-resin adducts of the above. A more comprehensive list of epoxy resins can be found in *Handbook of Epoxy Resins*, by Henry Lee and Kris Neville, McGraw-Hill, Inc., 1967, which is hereby incorporated by reference. A highly preferred epoxy resin polymer for use in the present invention is diglyciwherein n is an integer from 0 to 18, desirably from 0 to 14.3, and preferably from 0 to 5.5. The average molecular weight of DGEBA is from about 340 to about 4000, and preferably from about 340 to 2600.

The above-described epoxy resins generally are part of two-part or one-part thermoset epoxy resin systems depending on the type of curing agent utilized therein. More particularly, two-part thermoset epoxy resin systems comprise an epoxy resin part and a physically separated amine curing agent part, which when combined with the epoxy resin will cure the epoxy resin either at room temperature or generally more rapidly at elevated temperatures, if desired. In contrast, one-part thermoset epoxy resin systems generally include an epoxy resin which is combined with a selected latent curing agent. By the term "latent," it is meant that the cure agent is unreactive or stable at ambient temperatures, thereby allowing the epoxy resin and the curing agent to be stored in a combined state without a curing reaction of the epoxy resin occurring. Such latent curing agents generally provide rapid cures of the epoxy resins with which they are combined at elevated temperatures and in the presence of accelerators such as monuron, nonuron, or diuron.

Curing agents which are suitable for use in the two-part epoxy resin systems of the present invention include many commercially available curing agents which are well known to the art and to the literature. Desirable curing agents include aliphatic diamines such as polymethylene diamines, polyether diamines, and branched-chain polymethylene diamines; linear and branched chain polyamines such as diethylenetriamine (DETA), iminobispropylamine, bis(hexamethylene) triamine, triethylenetetramine (TETA), TETA modified with epoxy resin or ethylene oxide, tetraethylenepentamine (TEPA), pentaethylenehexamine (PEHA), aminoethylethanolamine,dimethylaminopropylamine,diethylaminopropylamine (DEAPA), methylaminobispropylamine, substituted 1,2-diamines, and substituted polyamines; alicyclic polyamines such as menthane diamine, N-aminoethylpiperazine (AEP), 1,3-diaminocyclohexane, and isophoronediamine; aliphatic amines containing aromatic groups such as m-xylylenediamine, and tetrachloro-p-xylenediamine; aromatic primary amines such as m-phenylenediamine (MPDA), and 4-4'-methylenedianilene (MDA); linear and branched aliphatic tertiary amines such as tetramethylguanidene, triethanolamine, N,N,N',N'-tetraethyl-1,3-butenediamine, 2-dimethylamino-2-hydroxypropane, linear diamines, dialkyl aminoethanols, and alkyl tertiary monoamines; alicyclic tertiary amines such as N-N'-dimethylpiperazine, N-methylmorpholine, hexamethylenetetramine,N,N-bis[(2-hydroxy)propyl]piperazine, and 1,4-diazabicyclo(2.2.2)octane(triethylenediamine); unsaturated-ring tertiary amines such as 1-hydroxyethyl-2-heptadicylgloxalidene, pyrazine, pyridene, and quinoline; aromatic ring-containing aliphatic tertiary amines such as benzyldimethylamine, 2-(dimethylaminomethyl)phenol(DMP-10), α-methylbenzyldimethylamine, and 2,4,6-tris(dimethylaminomethyl)phenol (DMP-30); tertiary amine salts such as tri-2-ethylhexoate salt of DMP-30, quaternary bases such as benzyltrimethylammonium chloride; secondary amines such as N-methylpiperazine, piperidine, morpholine, hydroxyethylpiperazine, pyrrolidine, and anabasine.

Amides can also be used as curing agents in two-part epoxy resin systems and include amidopolyamines, imidazoline polyamines, and fatty polyamides. Amidopolyamines are frequently selected as the curing agent in two-part epoxy resin systems.

Miscellaneous nitrogen-containing compounds can also be used as curing agents in two-part epoxy resin systems and include urea, urea-formaldehyde, and substituted ureas; melamines and other s-triazine-type curing agents such as melamines including melamine and N,N-diallylmelamine and other guanamines, melamine-, formaldehyde resins, hexamethoxy methyl-melamine, triallylcyanurate, and cyanuric chloride; imidazoles such as 2-ethyl-4-methylimidazole; hydrazides such as carbohydrazide and adipic acid dihydrazide; guanidines such as tetramethylguanidine and heptamethylisoguanidine; nitrosamines such as ethylenically unsaturated α,β-nitrosamines; ethylene amines such as polyalkylene imines; thioureas such as polythioureas, and sulfonamides.

Acid curing agents suitable for two-part epoxy resin systems include Lewis acids such as BF₃ piperidine; phenolics such as novolac resins and resole resins; inorganic acids such as phosphoric acid; and organic acids.

Acid-anhydride curing agents suitable for two-part epoxy resins include linear aliphatic anhydrides such as polysebacic polyanhydride (PSPA) and polyazelaic polyanhydride (PAPA); alicyclic anhydrides such as succinic anhydride, citraconic anhydride, itaconic anhydride, dodecyenylsuccinic anhydride, tricarbalylic anhydride, maleic anhydride, linoleic acid adduct of maleic anhydride, copolymer of maleic anhydride and vinyl ether, copolymer of maleic anhydride and styrene, maleic anhydride adduct of methylcyclopentadiene, alkylated endoalkylene-tetrahydrophthalic anhydride, dimethyl-substituted butenyltetrahydrophthalic anhydride, methyltetrahydrophthalic anhydride, and hexahydrophthalic anhydride (HHPA), and alkenyl anhydrides; multi-ring alicyclic dianhydrides such as bis nadic anhydrylbutene; aromatic anhydrides such as phthalic anhydride, trimellitic anhydride, pyromellitic dianhydride (PMDA), PMDA in blends with monoanhydrides, PMDA in solvents, PMDA-glycol adducts, and PMDA dispersions; chlorinated and brominated anhydrides such as dichloromaleic anhydride and chlorendic anhydride.

Latent curing agents which are suitable for use in the one-part thermoset epoxy resin systems used in the present invention include many commercially available curing agents which are well-known to the art and to the literature. Some desirable curing agents include solid polyamides such as HT-939 which is manufactured by Ciba-Geigy Corporation; BF₃ monoethylamine (BF₃MEA); and diaminodiphenylsulfone (DDS). The preferred latent curing agent is dicyandiamide which has the following structural formula:

Micropulverized dicyandiamide typically is admixed with the epoxy resin polymer of the one-part thermoset epoxy resin system preferably at ambient temperatures, or alternatively is milled into the epoxy resin polymer on a three-roll ink mill, preferably at ambient temperatures. No other special conditions are necessary for either method of incorporating the dicyandiamide into the epoxy resin polymer of the one-part system.

The low viscosity statistical monofunctional reactive liquid polymer compositions of the present invention are generally of two different types produced by two distinct processes. More particularly, the first type is a reaction product statistical monofunctional polymer composition, and the second type is a blended product statistical monofunctional polymer composition. With regard to the reaction product statistical monofunctional composition, the composition is the reaction product of various components such as vinyl-containing monomers and various initiators and result in a statistical monofunctional carboxyl-terminated reactive liquid rubber polymer from which can be made a statistical monofunctional amine-terminated reactive liquid rubber polymer, or a statistical monofunctional epoxy-terminated reactive liquid rubber polymer. The polymeric composition is actually a blend or a mixture of difunctional polymers, monofunctional polymers, and non-functional polymers, generally containing an average functionality per polymer of from about 0.2 to about 1.8, desirably from about 0.7 to about 1.3, and preferably approximately one, and hence is referred to as a statistical monofunctional polymer The various carboxyl-terminated polymers, the various amine-terminated polymers, as well as the various epoxy-terminated polymers, can be blended together or mixed to form blends thereof. Considering the monofunctional terminated reactive liquid rubber polymer, it contains either a terminal carboxyl group, a terminal amine group, or a terminal epoxy group at one end of the polymer chain, and a non-reactive or non-functional group at the other end of the polymer chain. Each terminus is derived from a fragment of the initiators used in the synthesis employed to make the polymers. When the particular polymer is a difunctional terminated polymer, it will contain either a terminal carboxyl group, a terminal amine group, or a terminal epoxy group at both ends of the polymer chain. When the polymer is a non-functional polymer, it will contain non-functional groups on each end of the polymer chain.

The reaction product statistical monofunctional carboxyl-terminated reactive polymer of the present invention used to react with the epoxy resin is generally produced in the following manner.

The reaction product carboxyl-terminated statistical monofunctional polymer can be generally indicated by the structural formula

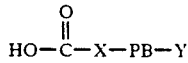

wherein $$HO-\overset{O}{\underset{\|}{C}}-X-$$

is derived from the difunctional initiator, —Y is derived from the non-functional initiator and —PB— represents the carbon-carbon backbone of the polymer. Generally, the difunctional carboxyl-terminated polymer is represented by the structural formula $$HO-\overset{O}{\underset{\|}{C}}-X-PB-X-\overset{O}{\underset{\|}{C}}-OH$$

The statistical monofunctional carboxyl-terminated polymers will contain generally a small or minority amount of such difunctional polymers, as well as non-functional polymers generally represented by the structural formula

Y—PB—Y wherein Y is derived from a non-functional initiator. Regardless of the amounts of the various difunctional, or monofunctional carboxyl-terminated polymers, as well as the non-functional terminated polymers, the overall reaction product statistical monofunctional carboxyl-terminated polymeric compositions generally contain from about 0.25 to about 4.5 percent by weight of carboxyl groups based upon the total weight of the statistical polymeric composition and have an acid number of from about 3.0 to about 52.

The non-reactive terminus —Y of the molecule referred to as such because it will not undergo condensation, as compared to the carboxyl terminus which will undergo that type of reaction. The composition of the terminus will vary depending upon the polymerization initiators used, however suitable groups include an alkyl or a nitrile.

The backbone —PB— of the reaction product statistical carboxyl-terminated polymer comprises repeating units made from any monomer which is polymerizable by any free radical reaction mechanism. The repeating unit composition of the polymer backbone may be made from a single monomer (homopolymer) or two or more monomers (copolymer). Preferably, the polymeric backbones are derived from at least one vinyl monomer having at least one terminal vinyl (CH$_2$=) group and up to 18 carbon atoms. Examples of suitable vinyl monomers include olefins having from 2 to 10 carbon atoms such as ethylene, isobutylene, dienes containing 4 to 10 carbon atoms, and preferably 4 to 8 carbon atoms, such as butadiene, isoprene (2-methyl-1,3-butadiene), 2-isopropyl-1,3-butadiene and chloroprene (2-chloro-1,3-butadiene); vinyl and allyl esters of carboxylic acids containing 2 to 8 carbon atoms such as vinyl acetate, vinyl propionate and allyl acetate; vinyl and allyl ethers of alkyl radicals containing 1 to 8 carbon atoms such as vinyl methyl ether and allyl methyl ether; and acrylates having the formula $$CH_2=\overset{R}{\underset{|}{C}}-\overset{O}{\underset{\|}{C}}-OR^1$$

wherein R is hydrogen or an alkyl radical containing 1 to 3 carbon atoms, such as methyl, ethyl, propyl, and isopropyl; R$^1$ is an alkyl radical containing 1 to 18 carbon atoms, and preferably 1 to 8 carbon atoms, or an alkoxyalkyl, alkylthioalkyl, or cyanoalkyl radical containing 2 to 12 carbon atoms, and preferably 2 to 8 carbon atoms. Preferably, R$^1$ is an alkyl radical containing 1 to 8 carbon atoms. Suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, octyl methacrylate, and the like. The polymeric backbone may comprise homopolymers of the above vinyl monomers or copolymers of two or more of the monomers.

The vinyl monomers described above may also be polymerized readily with up to about 50 percent by weight, but preferably up to about 35 percent by weight, of at least one comonomer such as a vinyl aromatic having the formula $$H_2C=\overset{R^2}{\underset{\underset{R^3}{|}}{C}}$$

wherein R$^2$ is hydrogen or methyl and R$^3$ is an aromatic moiety having from 6 to 15 carbon atoms resulting in compounds such as styrene, α-methyl styrene, chlorostyrene, and vinyl toluene; a vinyl nitrile having the formula $$CH_2=\overset{R^4}{\underset{|}{C}}-C\equiv N$$

wherein R$^4$ is hydrogen or methyl, resulting in compounds such as acrylonitrile and methacrylonitrile, respectively; vinyl acids having from 3 to 12 carbon atoms such as acrylic acid, methacrylic acid, and itaconic acid; an amide of olefinically unsaturated carboxylic acids containing 2 to 8 carbon atoms such as acrylamide and methacrylamide; or an allyl alcohol having from 3 to 10 carbon atoms.

Examples of suitable polymeric backbones include homopolymers of polyisoprene, polybutadiene, poly(vinylethylether), poly(ethylacrylate) and poly(butylacrylate); copolymers of butadiene and acrylonitrile, butadiene and styrene, vinyl acetate and isoprene, vinyl acetate and chloroprene, methyl acrylate and butadiene, methyl acrylate and ethyl acrylate, methyl acrylate and butyl acrylate, methyl acrylate and 2-ethylhexyl acrylate, ethyl acrylate and ethylene, ethyl acrylate and isobutylene, ethyl acrylate and isoprene, ethyl acrylate and butadiene, ethyl acrylate and vinyl acetate, ethyl acrylate and styrene, ethyl acrylate and chlorostyrene, ethyl acrylate and n-butyl acrylate, ethyl acrylate and 2-ethylhexyl acrylate; ethyl acrylate and acrylic acid; ethyl acrylate and acrylamide; butyl acrylate and styrene; butyl acrylate and acrylonitrile; butyl acrylate and vinyl chloride; terpolymers of butadiene, acrylonitrile, and acrylic acid; ethyl acrylate, styrene and butadiene; and ethyl acrylate, n-butyl acrylate and 2-ethylhexyl acrylate.

One group of preferred reaction product low viscosity statistical monofunctional carboxyl-terminated reactive liquid polymers have copolymeric backbones comprising from about 50 percent to about 99 or 100 percent by weight of a diene monomer, such as isoprene or butadiene, and up to about 50 percent by weight of a vinyl nitrile comonomer, such as acrylonitrile, or a vinyl aromatic such as styrene. The acrylonitrile content preferably is from about 10 percent to about 35 percent, desirably is from about 16 percent to about 26 percent, and most preferably about 16 percent. Such polymers have a carboxyl content of from about 0.4 percent to about 10 percent by weight, preferably 0.4 percent to about 2.5 percent by weight, based upon the total weight of the polymer. These polymers have a number average molecular weight of from about 1000 to about 12,000.

The greatest advantage provided by these statistical monofunctional carboxyl-terminated polymers is that their viscosity is approximately one-half (½) the value of an equivalent commercially known difunctional carboxyl-terminated polymer. This is demonstrated by the measured viscosities summarized in the following Table I, which compares the viscosity of the precursor statistical monofunctional carboxyl-terminated polymers of the present invention versus difunctional carboxyl-terminated polymers having the same compositions of butadiene homopolymers or butadiene/acrylonitrile copolymers.

Polymers "A" and "a" are homopolymers of butadiene while polymers B/b—D/d are butadiene/acrylonitrile copolymers. The polymer designations in upper case letters represent the precursor reaction product statistical monofunctional carboxyl-terminated polymers of the present invention, while the lower case letters represent structurally equivalent difunctional carboxyl-terminated polymers. The designation "EPHR" stands for Equivalents of Carboxyl Per Hundred Parts of Rubber.

TABLE I

Comparative Viscosity of Reaction Product Statistical Monofunctional vs. Difunctional Carboxyl Terminated Polymers

| Polymer | Acrylonitrile Content (% by weight) | Viscosity (mPa's @ 27° C.) | Carboxyl EPHR |
| --- | --- | --- | --- |
| A | — | 22,600 | 0.022 |
| a | — | 60,000 | 0.045 |
| B | 10.2 | 30,600 | 0.025 |
| b | 10.2 | 60,000 | 0.050 |
| C | 16.8 | 65,000 | 0.022 |
| c | 16.8 | 135,000 | 0.052 |
| D | 25.9 | 202,000 | 0.024 |
| d | 25.9 | 500,000 | 0.057 |

The blended product low viscosity statistical monofunctional reactive liquid polymer compositions of the present invention are generally the blended product of a statistical difunctional carboxyl, amine, or epoxy-terminated reactive liquid polymer and a non-functional polymer. Such blending of the statistical difunctional carboxyl-, amine-, or epoxy-terminated reactive liquid polymers with a non-functional polymer results in a statistical monofunctional carboxyl-, amine-, or epoxy-terminated reactive liquid rubber polymer, respectively. Thus, the blended product low viscosity statistical monofunctional reactive liquid polymer includes a blend of a difunctional-terminated polymer which contains either a terminal carboxyl group, a terminal amine group, or a terminal epoxy group at both ends of the polymer chain, and a non-functional polymer which contains non-functional groups on each end of the polymer chain.

One group of preferred blended product low viscosity statistical monofunctional terminated reactive liquid polymers have copolymeric backbones comprising from about 50 percent to about 99 or 100 percent by weight of a diene monomer, such as isoprene or butadiene, and up to about 50 percent by weight of a vinyl nitrile comonomer, such as acrylonitrile, or a vinyl aromatic such as styrene. The acrylonitrile content preferably is from about 10 percent to about 35 percent, desirably from about 16 percent to about 26 percent, and most preferably about 16 percent.

As with the reaction product statistical monofunctional terminated polymers, the greatest advantage provided by the blended product statistical monofunctional terminated polymers is that their viscosity is approximately one-half (½) the value of an equivalent commercially known difunctional terminated polymer. This is demonstrated by the measured viscosities summarized in Table IA below, which compares the viscosity of the blended product statistical monofunctional carboxyl-terminated polymers of the present invention versus difunctional carboxyl-terminated polymers having the same compositions of butadiene homopolymers or butadiene/acrylonitrile copolymers.

Polymers A' and a are homopolymers of butadiene while polymers C'/c and D'/d are butadiene/acrylonitrile copolymers. The polymer designations in primed upper case letters represent the blended product statistical monofunctional carboxyl-terminated polymers of the present invention, while the lower case letters represent structurally equivalent difunctional carboxyl-terminated polymers. The designation "EPHR" stands for Equivalents of Carboxyl per Hundred Parts of Rubber.

A comparison of the fracture energy for polymers C,c,D,d, and D' is presented in FIG. 1

TABLE IA

Comparative Viscosity of Blended Product Statistical Monofunctional vs. Difunctional Carboxyl Terminated Polymers

| Polymer | Acrylonitrile Content (% by weight) | Viscosity (mPa's @ 27° C.) | Carboxyl EPHR |
| --- | --- | --- | --- |
| A' | — | 20,450 | 0.020 |
| a | — | 60,000 | 0.045 |
| C' | 16.8 | 67,400 | 0.025 |
| c | 16.8 | 135,000 | 0.052 |
| D' | 25.9 | 218,000 | 0.028 |
| d | 25.9 | 500,000 | 0.057 |

It will be appreciated by one skilled in the art that the viscosity of individual polymers will vary depending upon the monomeric composition of the polymeric backbone. However, generally the viscosity ranges from about 10,000 mPa's to about 1.5 million mPa's. For polymers of polybutadiene or polybutadiene and acrylonitrile wherein the acrylonitrile content ranges from 0 percent to about 50 percent by weight of the polymer, the viscosity ranges from about 12,000 mPa's to about 1.5 million mPa's, and preferably 15,000 mPa's to about 1 million mPa's.

Thus, the above-described low viscosity statistical monofunctional carboxyl-terminated polymers formed by either the reaction or blending processes, which are generally liquids, are useful as a toughening and/or flexibilizing agent for any thermoset resin system. Thermoset resins include, but are not limited to, epoxides, phenolics, alkyds and polyesters. Specific system applications can be at ambient temperatures and include those rich in resin and those rich in rubber. Resin rich system applications include one and two-part adhesives, especially adhesives made of thermoset resins such as epoxy, for uses including structural adhesives in the marine, automotive and aircraft industries; electrical and electronic potting compounds and encapsulants; cast pipe; sheet molding compound other than epoxy; and bulk molding compound. Castable rubber rich system applications include rocket and missile fuel binders; and construction and civil engineering applications including roofing, flooring, water-impermeable membranes, and crack sealers.

As discussed earlier hereinabove, the significantly lowered viscosity of the statistical monofunctional polymers attaches substantial advantages over known similar difunctional polymers. Typically, the viscous difunctional polymers require warming to reduce their viscosity and render them more workable, especially in the field. The present low viscosity statistical monofunctional polymers do not require warming prior to use and will be preferred for applications which must be performed at relatively lower ambient temperatures. Additionally, these statistical monofunctional polymers provide faster air release and better mixing. Therefore, these polymers will be preferred for applications involving mixing, which tends to entrap air, which must then be released before continuing, such as with on-site structural repair jobs The low viscosity reaction product statistical monofunctional carboxyl-terminated reactive liquid polymers have further utility in that they also may be reacted to produce statistical monofunctional polymers having terminal functional groups other than carboxyls, such as amines or epoxies as described in detail below.

Generally, the reaction product statistical monofunctional carboxyl-terminated polymer can be made by the polymerization process as set forth in detail immediately below. The polymerization process utilizes any conventional addition polymerization technique employing a free radical mechanism. Generally, the reaction is conducted by mixing one or more backbone-forming monomers with a mixture of a difunctional and non-functional initiator, and a solvent, then heating. The monomers can be one or more of the polymerizable monomers described hereinabove.

The initiator is a mixture or blend of two different initiators, namely a difunctional initiator and a non-functional initiator, capable of initiating a free radical polymerization.

Considering the difunctional initiator, any difunctional initiator can be used. However, one skilled in the art will appreciate that when a difunctional initiator other than an organic acid is used, conversion of the terminal groups to acid groups will be required. For example, the hydroxyl groups on hydrogen peroxide or hydroxy ethyl disulfide require conversion to acid groups. Conventional methods may be used to accomplish the conversion such as by reaction with a cyclic acid anhydride, for example succinic anhydride. Preferably the difunctional initiator is an organic azo compound or a peroxide. The organic azo initiator preferably is a bis-azocyano acid having the formula

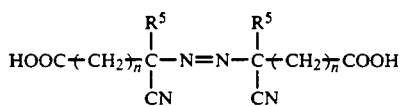

wherein $R^5$ is an alkyl group of 1–3 carbon atoms, and n is an integer from 0 to 6. The preferred acids include azodicyanobutyric acid and azodicyanovaleric acid (ADVA), with ADVA being highly preferred. The preparation of these materials is known and disclosed in U.S. Pat. Nos. 3,285,949 and 2,520,338, which are incorporated herein by reference. The organic azo initiator decomposes to form $N_2$ gas and free radicals having the formula

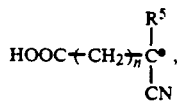

with the portion thereof having the structural formula

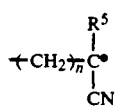

being represented by —X— in the structural formula shown above for the monofunctional carboxyl-terminated polymer. The action of this type of initiator is due to the fact that the azo carbon-nitrogen bond is readily dissociated, as by thermal means.

The preferred difunctional peroxide initiator has the formula

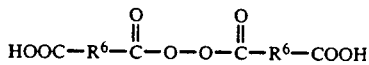

wherein $R^6$ is an alkyl group having from about 2 to about 6 carbon atoms, and preferably 3 carbon atoms. A desirable peroxide is succinic acid peroxide and a preferred peroxide is glutaric acid peroxide. The difunctional peroxide initiator decomposes to form $CO_2$ gas and free radicals having the formula

HOOC—$R^6$• wherein $R^6$ represented by X in the structural formula shown above for the reaction product monofunctional carboxyl-terminated precursor polymer. The action of this type of initiator is due to the fact that the peroxide oxygen-oxygen bond is readily dissociated, as by thermal means.

Considering the non-functional initiator, any non-functional azo or peroxide initiator can be used. Preferably the azo initiator is a bis-azocyano having the formula

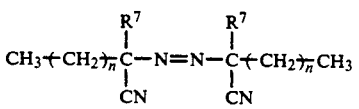

wherein $R^7$ is an alkyl group of 1–3 carbon atoms and n is an integer from 0 to 6. Such compounds are known and disclosed in U.S. Pat. No. 2,556,876. The preferred compound is 2,2'-azobis(2-methylpropionitrile) also known as AIBN. The azo initiator decomposes to form $N_2$ gas and free radicals having the formula

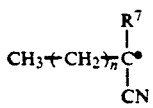

which is represented by —Y as the non-reactive terminus of the precursor monofunctional carboxyl-terminated polymer described above. The action of this type of initiator also is due to the fact that the azo carbon-nitrogen bond is readily dissociated, as by thermal means.

The non-functional peroxide initiator preferably is an acyl peroxide having the formula

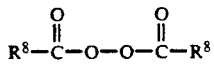

wherein $R^8$ is an aromatic, or an unsubstituted or a substituted alkyl group desirably having from about 1 to about 15 and preferably from about 1 to about 6 carbon atoms. Desirable peroxides include diacetyl peroxide, dilauryl peroxide, didecanoyl peroxide, and diisononanoyl peroxide, with dibenzoyl peroxide being preferred. The non-functional peroxide initiator decomposes to form $CO_2$ gas and free radicals having the formula $\bullet R^8$ which also is represented by Y as the non-reactive terminus of the precursor monofunctional carboxyl-terminated polymer described above. The action of this type of initiator is also due to the fact that the peroxide oxygen-oxygen bond is readily dissociated, as by thermal means.

The amount of initiators present, on a mole basis, may vary from about 0.2 percent to about 90 percent difunctional initiator and from about 10 percent to about 99.8 percent non-functional initiator. Preferably from about 30 percent to about 75 percent difunctional initiator is used and from about 70 percent to about 25 percent non-functional initiator. Most preferred is from about 60 percent to about 40 percent difunctional initiator and from about 40 percent to about 60 percent nonfunctional initiator. As noted, one skilled in the art will appreciate that the monofunctional polymer product is a blend or mixture of molecules having different end groups, namely a monofunctional species, a difunctional species and a non-functional species. When the ideal 50/50 blend of difunctional and non-functional initiators is used, it is expected that, statistically, one obtains by weight, from about 5 percent to about 90 percent difunctional specie, from about 90 percent to about 5 percent non-functional specie, and about 5 percent to about 50 percent monofunctional specie; desirably from about 10 percent to about 50 percent difunctional specie, from about 10 percent to about 50 percent non-functional specie, and up to about 50 percent monofunctional specie; and preferably about 25 percent difunctional specie, about 25 percent nonfunctional specie and about 50 percent monofunctional specie. When other ratios of difunctional and non-functional initiators are utilized, it will be appreciated that the end amount of the non-functional terminated polymer as well as the difunctional terminated polymer will generally vary in accordance with the ratio of the difunctional polymer to the non-functional polymer, but that the amount of the monofunctional specie will generally be no higher than 50 percent. However, as noted above, the blend or mixture of the statistical monofunctional carboxyl-terminated polymer desirably has an average functionality per polymer of approximately 1.

The liquid polymerization products can be prepared in any solvent for the initiators, the monomers or the polymers. The solvent is desirably low boiling so it can be readily removed. Such solvents are generally polar and do not act as chain transfer agents. Examples of such solvents include the various ketones having from 2 to about 10 carbon atoms, various alcohols having from 1 to about 7 carbon atoms, various aromatic compounds having from about 6 to about 10 carbon atoms, various esters of a carboxylic acid wherein the ester portion has up to about 4 carbon atoms and the dicarboxylic acid has from about 2 to about 3 or 4 carbon atoms in the non-ester portion, and various ethers including internal ethers having from about 3 to about 7 carbon atoms. Specific examples of suitable solvents include acetone, methyl ethyl ketone, 2-pentanone, 3-pentanone, methyl isobutyl ketone, methyl alcohol, ethyl alcohol, n-propyl alcohol, isopropyl alcohol, butyl alcohol, isobutyl alcohol, sec-butyl alcohol, tert-butyl alcohol, benzene, toluene, methyl acetate, ethyl acetate, propyl acetate, and tetrahydrofuran. Acetone is preferred.

The reaction temperature may range from about 40° C. to about 120° C., desirably 60° C. to about 100° C., and preferably from about 70° C. to about 90° C. The number average molecular weight (Mn) of the precursor statistical monofunctional carboxyl-terminated polymers ranges from about 1,000 to about 12,000, based upon the size exclusion chromatography method of determination.

Those skilled in the art will appreciate that in order to form a polymer having uniform composition throughout the charge and maintain constant molecular weight over the length of the polymerization, the initiator, and comonomer if copolymerizing, must be continuously metered throughout the polymerization. Therefore, the statistical monofunctional carboxyl-terminated polymers are made by a method whereby initially, the reactor is charged with monomer, and a small amount of initiator and comonomer if copolymerizing, and all of the polymerization solvent. The exact amounts of monomers and initiator will vary depending upon the product polymer, however, the amounts can be readily determined experimentally by conventional methods of calculation. Then, after bringing the reaction mixture to reaction temperature, more initiator, and comonomer if copolymerizing, are added during polymerization such that they are continuously metered including incremental addition or a plurality of batch additions, etc. throughout polymerization.

No emulsifier is necessary for this process. After polymerization it may be desirable to add conventional additives to the polymer, depending upon its end use, such as thermal stabilizers, including Geltrol® commercially available from The BFGoodrich Company, Akron, Ohio, U.S.A.

Generally, the blended product low viscosity statistical monofunctional carboxyl-, amine-, or epoxy-terminated polymer each is made by blending a difunctional carboxyl-, amine-, or epoxy-terminated polymer with a non-functional polymer. Suitable types of statistical dicarboxyl-terminated liquid rubbers which have been found satisfactory for use in the formation of the blended product statistical monofunctional carboxyl-terminated polymer of the present invention, are manufactured by the assignee of the present invention, BFGoodrich Chemical Company, and are sold under the trademarks Hycar CTB, Hycar CTBN, Hycar CTBNX, and the like.

Hycar CTB is a carboxyl-terminated butadiene type polymer and may be approximately represented by the formula:

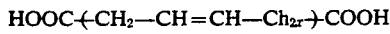

HOOC—(CH$_2$—CH=CH—Ch$_{2x}$)—COOH wherein x represents the number of butadiene units per molecule, with x desirably being from about 40 to about 300, and preferably from about 75 to about 85. Hycar CTB has a functionality of about 2.

Hycar CTBN is a carboxyl-terminated butadieneacrylonitrile type random copolymer which may be approximately represented by the formula:

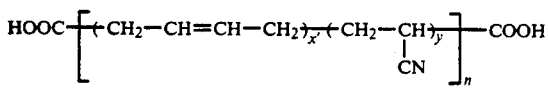

$$\text{HOOC}-\left[-(CH_2-CH=CH-CH_2)_{x'}-(CH_2-\underset{\underset{CN}{|}}{CH})_{y'}-\right]_n-\text{COOH}$$

wherein x' represents the number of butadiene units per molecule and y represents the number of acrylonitrile units per molecule, with the weight ratio of x' to y being from about 0.9 to about 0.1 for the random copolymer containing 10 percent acrylonitrile, from about 0.8 to about 0.2 for the copolymer containing 17 percent acrylonitrile, and from about 0.7 to about 0.3 for the copolymer containing 26 percent acrylonitrile, and with n desirably being from about 40 to about 300, and preferably from about 75 to about 85. The copolymer has a functionality of from about 1.8 to about 1.85.

Hycar CTBNX is a carboxy-terminated butadiene-acrylonitrile-acrylic acid terpolymer which may be approximately represented by the formula:

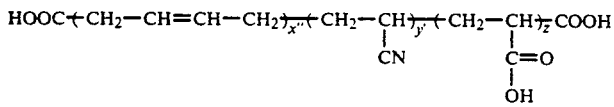

$$\text{HOOC}-(CH_2-CH=CH-CH_2)_{x''}-(CH_2-\underset{\underset{CN}{|}}{CH})_{y'}-(CH_2-\underset{\underset{\underset{OH}{|}}{C=O}}{CH})_{z}-\text{COOH}$$

wherein x" represents the number of butadiene units per molecule, y' represents the number of acrylonitrile units per molecule, and z represents the number of acrylic acid units per molecule, and further wherein the terpolymer contains from about 17 percent to about 20 percent acrylonitrile and preferably has a molecular weight of from about 2,000 to about 15,000. The terpolymer has a functionality of about 2.3.

Elastomers having a functional carboxyl termination at each end of the polymer chain are described more fully in U.S. Pat. No. 3,285,949, which is hereby fully incorporated by reference.

Difunctional amine-terminated reactive liquid polymers which are suitable for use in preparing the blended product statistical monofunctional amine-terminated reactive liquid polymers used to modify epoxy resins are prepared in accordance with the process set forth in U.S. Pat. No. 4,133,957, which is hereby fully incorporated by reference.

Difunctional epoxy-terminated reactive liquid polymers used in preparing the blended product statistical monofunctional epoxy-terminated polymers used to modify the epoxy resins are prepared in accordance with the process set forth in U.S. Pat. No. 4,530,962, which is hereby fully incorporated by reference.

The non-functional polymers which are blended with the various difunctional-terminated polymers described above to form the blended product statistical monofunctional polymers used to modify the epoxy resins, are well known to the art and to the literature.

The selected statistical difunctional and non-functional terminated polymers are brought together and blended in a simple stirrer or mixing device at a temperature of from about 40° C. to about 120° C., desirably from about 50° C. to about 90° C., and preferably from about 50° C. to about 60° C. The amount of difunctional and non-functional polymers present, on a mole basis, may vary from about 0.2 percent to about 90 percent difunctional polymer and from about 10 percent to about 99.8 percent non-functional polymer. Desirably from about 30 percent to about 75 percent difunctional polymer is used and from about 70 percent to about 25 percent non-functional polymer. Preferably from about 60 percent to about 40 percent difunctional polymer and from about 40 percent to about 60 percent non-functional polymer, and most preferably a blend of about 50 percent difunctional polymer and about 50 percent non-functional polymer is used. As noted, one skilled in the art will appreciate that the blended monofunctional polymer product is a mixture of molecules having different end groups, namely a difunctional species and a non-functional species. When the various amounts of difunctional and non-functional polymers are utilized in the mole amounts set forth above, it is expected that, statistically, one obtains an average functionality of from about 0.004 to about 1.8, desirably from about 0.6 to about 1.5, preferably from about 0.8 to about 1.2, and most preferably an average functionality of about 1.0. However, as noted above, the blended product statistical monofunctional terminated polymer desirably has an average functionality of approximately 1.

The above-described processes for forming the reaction and blended product low viscosity statistical monofunctional terminated reactive liquid polymers will be better understood by the following examples, which relate to the formation of the carboxyl-terminated form of the reaction and blended product statistical monofunctional polymers.

EXAMPLE 1 (REACTION PROCESS)

A reaction product statistical monofunctional carboxyl-terminated polymer was obtained in the following experiment. A 20 gallon reactor was cooled to 25° C. and evacuated to suck in 2.08 Kg acrylonitrile, 6.12 Kg. acetone and 0.99 Kg initiator solution, in sequence. The initiator solution concentration was 10.3 percent ADVA and 6.03 percent AIBN. The reactor was evacuated until the acetone boiled (about 20–25"Hg), then pressured to 20 psi with nitrogen. This was repeated and the reactor once again evacuated to 20'Hg. The vacuum was broken by charging 38.0 lbs. of butadiene. The mixture was heated to reaction temperature of 85° C. and allowed to react for approximately 13 hours. During polymerization, additional initiator mixture and acrylonitrile were metered into the reaction vessel. Conventional techniques were used to recover the product which had an acid number of 12.9, viscosity at 27° C. of 65,000 mPa's and a bound acrylonitrile content of 16.5 percent.

EXAMPLE 2 (REACTION PROCESS)

A reaction product statistical monofunctional carboxyl-terminated polymer was obtained in the following experiment. A 15 gallon reactor was cooled to 25° C. and evacuated to suck in 3.52 Kg acrylonitrile, 5.58 Kg acetone and 2.72 Kg initiator solution, in sequence. The initiator solution concentration was 8.0 percent ADVA and 4.7 percent AIBN. The reactor was evacuated until the acetone boiled (about 20-25'Hg), then pressured to 20 psi with nitrogen. This was repeated and the reactor once again evacuated to 20'Hg. The vacuum was broken by charging 30.22 lbs. of butadiene. The mixture was heated to reaction temperature, 75° C. and allowed to react for approximately 26 hours. During polymerization, additional initiator mixture and acrylonitrile were metered into the reaction vessel. Conventional techniques were used to recover the product which had an acid number of 13.3, viscosity at 27° C. of 202,000 mPa's and a bound acrylonitrile content of 25.9 percent.

EXAMPLE 2A (BLENDING PROCESS)

A blended product statistical monofunctional carboxyl-terminated polymer was obtained in the following experiment.

First, the non-functional polymer was prepared in the following manner. A 15 gallon reactor was cooled to 25° C. and evacuated to suck in 4.0 lbs. acrylonitrile, 11.7 lbs. acetone and 1.8 lbs. initiator solution, in sequence. The initiator solution concentration was 15.0 percent VAZ067. The reactor was evacuated until the acetone boiled (about 20-25'Hg), then pressured to 20 psi with nitrogen. This was repeated and the reactor once again evacuated to 20'Hg. The vacuum was broken by charging 32.0 lbs. of butadiene. The mixture was heated to a reaction temperature of 85° C. and allowed to react for approximately 20 hours. During polymerization, additional initiator mixture and acrylonitrile were metered into the reaction vessel. Conventional techniques were used to recover the product which had viscosity at 27° C. of 36,700 mPa's and a bound acrylonitrile content of 17.2 percent.

Next, the difunctional carboxyl-terminated polymer was synthesized in the following manner. A 15 gallon reactor was cooled to 25° C. and evacuated to suck in 4.2 lbs. acrylonitrile, 12.3 lbs. acetone and 2.5 lbs. initiator solution, in sequence. The initiator solution concentration was 16.3 percent ADVA. The reactor was evacuated until the acetone boiled (about 20-25"Hg), the then pressured to 20 psi with nitrogen. This was repeated and the reactor once again evacuated to 20"Hg. The vacuum was broken by charging 34.7 lbs. of butadiene. The mixture was heated to reaction temperature of 85° C. and allowed to react for approximately 20 hours. During polymerization, additional initiator mixture and acrylonitrile were metered into the reaction vessel. Conventional techniques were used to recover the product which had an acid number of 30.0 viscosity at 27° C. of 117,000 mPa's and a bound acrylonitrile content of 17.7 percent.

The synthesized difunctional and non-functional terminated polymers then were brought together and blended in a suitable glass or steel container of sufficient size using a suitable stirrer, at a temperature of about 60° C.

The synthesized reaction product or blended product low viscosity statistical monofunctional carboxyl-terminated reactive liquid polymer can be reacted with either a two-part epoxy resin system or a one-part epoxy resin system to form the cured and toughened epoxy resins of the present invention.

If the epoxy resin is part of a two-part thermoset epoxy resin system containing an amine curing agent, the epoxy resin and the curing agent are maintained physically separate until such time as it is desired to cure the epoxy resin. The equivalent weight ratio of the curing agent part to the epoxy resin part is from about 0.25 to about 5.0 and preferably from about 0.9 to about 1.1. In such two-part epoxy resin systems, the statistical monofunctional carboxyl-terminated reactive polymer, which desirably is in liquid form, preferably is admixed with the epoxy part of the system before introduction of the curing agent. Admixture of the statistical monofunctional carboxyl-terminated reactive polymer with the curing agent part of the system with subsequent combining with the epoxy resin part of the system, generally is undesirable because carboxylic amine salts would be formed as a by-product which would unacceptably increase the viscosity of the epoxy resin system prior to cure. The statistical monofunctional carboxyl-terminated liquid rubber is utilized in amounts of from about 2 parts to about 150 parts, desirably from about 2 parts to about 50 parts, and preferably from about 5 parts to about 20 parts. One hundred parts of the epoxy resin preferably is used. The admixing generally is carried out at ambient temperatures with no other special conditions being required.

Subsequent to admixture of the statistical monofunctional carboxyl-terminated rubber and the epoxy resin part of the two-part epoxy resin system, the curing agent part of the system is promptly combined with the carboxyl-terminated rubber/epoxy resin admixture. The selected curing agent generally is capable of curing the admixture either at room temperature or at elevated temperatures of from about 50° C. to about 200° C., and preferably from about 80° C. to about 130° C. Such elevated temperatures generally reduce curing time over cures conducted at room temperature. No other special conditions are necessary to carry out the curing reaction. The modified epoxy resin of the present invention thus is formed and has the previously described following general structural formula:

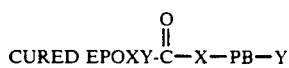

It is to be noted that the selected curing agent cures the above-described pre-cure low viscosity blend of epoxy resin and statistical monofunctional carboxyl-terminated rubber through chain extending and crosslinking the epoxy groups of the epoxy resin to form a network.

The present invention will be better understood by the following example, which illustrates the unexpectedly good properties such as fracture energy ($G_{Ic}$) obtained in the present invention by comparing the performance of the statistical monofunctional carboxyl-terminated polymers to conventional dicarboxyl-terminated polymers in a model two-part epoxy system.

EXAMPLE 3

Physical property evaluations were conducted on polymer samples and illustrate the unexpected mechanical properties obtained in the present invention by comparing the performance of the statistical monofunctional carboxyl-terminated polymers to conventional dicarboxyl-terminated polymers in a model two-part epoxy system.

Low viscosity statistical monofunctional carboxyl-terminated polymers were prepared in accordance with the methods set forth in Examples 1, 2 and 2a hereinabove. These were nitrile rubber monofunctional polymers having butadiene/acrylonitrile backbones. Polymer C contained 17 percent by weight acrylonitrile (Recipes 3-6) and polymers D and D' contained 26 percent by weight acrylonitrile (Recipes 11-14 and 19-22, respectively). Polymers C and D were prepared by the reaction product process set forth in Examples 1 and 2, and polymer D' was prepared by the blending process set forth in Example 2A. The corresponding difunctional Carboxyl-terminated polymers, c (Examples 7-10) and d (Examples 15-18) contained the same amounts of acrylonitrile, respectively.

The samples which were tested consisted of model two-part epoxy recipes, set forth below, whereby carboxyl-functional polymer was cured with DGEBA (diglycidyl ether of bisphenol A) epoxy resin using piperidine as a catalyst. Mechanical property measurements were made by mixing the model epoxy recipes, and casting the mixtures into 8×10×0.25 inch (20×25×0.635 cm) Teflon-coated aluminum molds They were cured for one (1) hour at 120° C. Tensile and Compact Tension specimens were machined from these 0.25 inch (0.635 cm) plaques and tested according to ASTM D-638 and E-399 for mechanical and fracture toughness properties respectively The results are set forth in Table II. Fracture toughness is represented by $K_{Ic}$, and Fracture Energy, which is the energy necessary to propagate a crack through the material, is $G_{Ic}$, while glass transition temperature is Tg.

The mechanical properties summarized in Table II show that all of the modified epoxy resins show some loss of tensile strength and modulus over that for the unmodified resin. And these losses increase with the amount of modifying polymer. However, the elongation at break generally increases with increasing amount of polymer. Polymers C, D, d, and D' all show equal to or greater elongations than the control recipe (Recipes 3, 11, 15, and 19, respectively). Polymer c (Control Recipe 7) shows almost no increase in elongation with increasing levels of polymer. The glass transition, Tg, does not appear to change with increasing amount of polymer up to 15 phr. The most significant changes occur in the critical strain energy release rate, or fracture energy, $G_{Ic}$ and the stress intensity factor $K_{Ic}$ These quantities are related by the following equation for plane strain conditions:

$$G_{IC} = \frac{K_{IC}^2}{E}(1 - v^2)$$

where $v$=Poisson's ratio, and E=Young's modulus.

From this equation one can see that increases in fracture energy, $G_{Ic}$, of a material require an increase in $K_{Ic}$ with increasing amount of polymer so that any increases in $G_{Ic}$ cannot be attributed to a large decrease in modulus. Polymers c, C, D, and D' are examples of two phase toughening and all show increases in fracture energy up to at least 10 phr of polymer. Polymer d with 26 percent acrylonitrile has a very small particle size second phase and thus shows only a very modest increase in $G_{Ic}$.

Polymer c at 15 phr shows the highest fracture energy.

TABLE II

Mechanical Properties of DGEBA Epoxy Resin, Cured Using Piperidine As Catalyst, Containing Statistical Carboxyl-Terminated Polymers

| | Reaction Product Monofunctional Polymer | | | |
|---|---|---|---|---|
| Recipe | 3 | 4 | 5 | 6 |
| DGEBA Liquid Epoxy | 100 | 100 | 100 | 100 |
| Polymer C (17% Acrylonitrile) | 0 | 5 | 10 | 15 |
| Piperidine | 5 | 5 | 5 | 5 |
| Tensile Strength, mPa | 59.1 | 51.0 | 47.2 | 45.2 |
| Elongation % | 7.96 | 7.44 | 10.4 | 14.6 |
| Modulus, GPa | 2.75 | 2.58 | 2.25 | 2.09 |
| $K_{Ic}$, MN/m3/2 | 0.764 | 1.83 | 2.4 | 2.26 |
| $G_{Ic}$, KJ/m2 | 0.188 | 1.15 | 2.26 | 2.17 |
| Tg, °C. | 90 | 89 | 90 | 90 |

| | Difunctional Polymer | | | |
|---|---|---|---|---|
| Recipe | 7 | 8 | 9 | 10 |
| DGEBA Liquid Epoxy | 100 | 100 | 100 | 100 |
| Polymer c (17% Acrylonitrile) | 0 | 5 | 10 | 15 |
| Piperidine | 5 | 5 | 5 | 5 |
| Tensile Strength, mPa | 59.1 | 52.1 | 47.3 | 42.8 |
| Elongation % | 7.96 | 5.2 | 5.2 | 7.4 |
| Modulus, GPa | 2.75 | 2.49 | 2.22 | 1.91 |
| $K_{Ic}$, MN/m3/2 | 0.764 | 2.03 | 2.54 | 2.66 |
| $G_{Ic}$, KJ/m2 | 0.188 | 1.47 | 2.56 | 3.29 |
| Tg, °C. | 90 | 90 | 89 | 88 |

| | Reaction Product Monofunctional Polymer | | | |
|---|---|---|---|---|
| Recipe | 11 | 12 | 13 | 14 |
| DGEBA Liquid Epoxy | 100 | 100 | 100 | 100 |
| Polymer D (26% Acrylonitrile) | 0 | 5 | 10 | 15 |
| Piperidine | 5 | 5 | 5 | 5 |
| Tensile Strength, mPa | 59.1 | 54.5 | 48.6 | 44.3 |
| Elongation % | 7.96 | 8.35 | 9.57 | 12.9 |
| Modulus, GPa | 2.75 | 2.12 | 1.89 | 1.67 |
| $K_{Ic}$, MN/m3/2 | 0.764 | 1.96 | 2.34 | 2.12 |
| $G_{Ic}$, KJ/m2 | 0.188 | 1.60 | 2.56 | 2.37 |
| Tg, °C. | 90 | 88 | 88 | 87 |

| | Difunctional Polymer | | | |
|---|---|---|---|---|
| Recipe | 15 | 16 | 17 | 18 |
| DGEBA Liquid Epoxy | 100 | 100 | 100 | 100 |
| Polymer d (26% Acrylonitrile) | 0 | 5 | 10 | 15 |
| Piperidine | 5 | 5 | 5 | 5 |
| Tensile Strength, mPa | 59.1 | 57.9 | 47.1 | 43.9 |
| Elongation % | 7.96 | 9.19 | 11.3 | 16.7 |
| Modulus, GPa | 2.75 | 2.70 | 2.40 | 2.38 |
| $K_{Ic}$, MN/m3/2 | 0.764 | 1.45 | 1.55 | 1.84 |
| $G_{Ic}$, KJ/m2 | 0.188 | 0.69 | 0.88 | 1.3 |
| Tg, °C. | 90 | 90 | 90 | 88 |

| | Blended Product Monofunctional Polymer | | | |
|---|---|---|---|---|
| Recipe | 11 | 12 | 13 | 14 |
| DGEBA Liquid Epoxy | 100 | 100 | 100 | 100 |
| Polymer D' (26% Acrylonitrile) | 0 | 5 | 10 | 15 |
| Piperidine | 5 | 5 | 5 | 5 |
| Tensile Strength, mPa | 58.4 | 46.7 | 60.3 | 52.6 |
| Elongation % | 2.4 | 1.94 | 4.58 | 3.19 |
| Modulus, GPa | 2.46 | 2.61 | 2.2 | 2.2 |
| $K_{Ic}$, MN/m3/2 | 0.86 | 1.85 | 2.27 | 2.26 |
| $G_{Ic}$, KJ/m2 | 0.266 | 1.16 | 2.06 | 2.06 |
| Tg, °C. | 90 | 88 | 87 | 88 |

A graphic summary of the comparative fracture energy ($G_{Ic}$) values in Recipes 3-22 is presented in FIG. 1. The fracture energy, or the amount of energy necessary to propagate a crack through the material, is expressed in units of kilojoules per meter squared (KJ/m2) on the Y-axis versus the amount of polymer expressed in units of parts per hundred of resin (PHR) on the X-axis. For epoxy recipes containing up to 10 parts polymer, all three low viscosity monofunctional polymers C, D and D' generally behave like the difunctional polymer c containing 17 percent acrylonitrile. The polymers C, D, and D' demonstrated a performance superior to the difunctional polymer d containing 26 percent acrylonitrile.

If the epoxy resin is part of a one-part thermoset epoxy resin system containing a latent cure agent, the equivalent weight ratio of the curing agent to the epoxy resin is from about 0.25 to about 5.0 and preferably from about 0.9 to about 1.1. As previously discussed, by the term "latent" it is meant that the cure agent is unreactive or stable at ambient temperatures. The statistical monofunctional carboxyl-terminated reactive liquid polymer is combined with the one-part thermoset epoxy resin system containing the epoxy resin and the latent curing agent. The statistical monofunctional carboxyl-terminated liquid rubber is utilized in amounts of from about 2 parts to about 150 parts, desirably from about 2 parts to about 50 parts, and preferably from about 5 parts to about 20 parts per 100 parts of the epoxy resin. The curing agent of the one-part system typically is latent at room temperature, but provides rapid cures of the statistical monofunctional carboxyl-terminated rubber and the epoxy resin at temperatures of from about 50° C. to about 200° C., and preferably from about 130° C. to about 150° C., in the presence of accelerators such as monuron, nonuron, or diuron. No other special conditions are necessary for carrying out the curing reaction. By this process a modified epoxy resin of the present invention having the following general structural formula is produced:

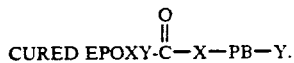
CURED EPOXY-C—X—PB—Y.

It is to be noted that the selected latent curing agent cures the above-described epoxy resin and statistical monofunctional carboxyl-terminated rubber by chain extending and crosslinking the epoxy groups of the epoxy resin to form a network.

The reaction product statistical monofunctional amine-terminated reactive polymer of the present invention alternatively utilized to react with the epoxy resin is synthesized in the following manner. The reaction product monofunctional carboxyl-terminated polymer, as previously noted, which is actually a blend or mixture of statistical monofunctional carboxyl-terminated polymers, the structure, formation and properties of which have been described in detail above and is hereby fully incorporated by reference, is reacted with a polyamine compound. Thus, the formed amine-terminated reactive liquid rubber polymer is also a statistical blend of difunctional amine-terminated polymers, monofunctional amine-terminated polymers, as well as non-functional polymers. The actual monofunctional amine-terminated reactive liquid rubber polymer can be generally represented by the structural formula

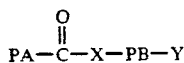
PA—C—X—PB—Y wherein X, Y, and PB are as set forth hereinabove and wherein PA is a polyamine compound. Naturally, it is to be understood that the polyamine/carboxylic acid salt initially formed will liberate water to form an amide during the condensation reaction. The difunctional amine-terminated reactive liquid rubber polymer can generally be represented by the structural formula

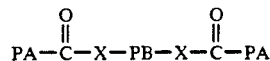
PA—C—X—PB—X—C—PA where PA and X are as described hereinabove. The actual non-functional terminated polymer will have the general structural formula Y—PB—Y where Y is as described hereinabove.

Generally, any reacted polyamine compound represented by PA in the above formula, that is a compound containing two or more amine groups therein, can be utilized to react with the precursor monofunctional carboxyl-terminated polymer, so long as the amine groups are primary or secondary, that is R'NH$_2$ or R"NHR'", respectively, where R', R" and R'" are hydrocarbon groups. Tertiary amines cannot be used because they will not react with the carboxylic acid group of the precursor polymer. The above formulation will thus contain an internal amide group formed by the reaction of one of the amine groups with the carboxyl group.

More specifically, the polyfunctional amines or the polyamine compounds which are suitable for use in the present invention generally can be represented by the formula

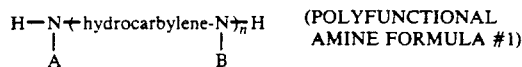

where the hydrocarbylene portion has from about 2 to about 20 carbon atoms. The number repeating units, that is n, is an integer of from about 1 to about 10, and preferably from about 1 to about 4. Thus, the polyamine can be an oligomer. A or B, independently, can be substantially hydrocarbon or hydrogen. Desirably, A or B, independently, are hydrogen or an alkyl having from 1 to about 30 carbon atoms, with from about 1 to about 8 carbon atoms being desirable. The hydrocarbylene group can generally be an aliphatic having from about 2 to about 20 carbon atoms and preferably from about 2 to about 12 carbon atoms. A desirable hydrocarbylene is an alkylene having from about 2 to about 20 carbon atoms with from about 2 to about 12 carbon atoms being preferred such as butanediamine, pentanediamine, hexane diamine, and the like. Another suitable hydrocarbylene is a cycloalkylene having from about 4 to about 20 carbon atoms with from about 4 to about 12 carbon atoms being preferred. Various hydrocarbylene aromatic compounds include phenylene, naphthalene and the like having from about 6 to about 20 carbon atoms with from about 6 to about 10 carbon atoms being preferred. Additionally, aromatic substituted alkyl or alkyl substituted aromatic groups can be utilized having from about 2 to about 10 carbon atoms with from about 5 to about 7 carbon atoms being preferred. Specific examples of suitable polyamines include the ethyleneamine family, that is ethylenediamine (EDA), diethylenetriamine (DETA), triethylenetetramine (TETA), tetraethylenepentamine (TEPA), and pentaethylenehexamine (PEHA). The propyleneamine family of products comprises 1,2-propanediamine (1,2-PDA), 1,3-propanediamine (1,3-PDA), iminobispropylamine (IBPA), dimethylaminopropylamine (DMAPA) and the like. Examples of other alkyleneamines include cyclic and the higher homologues of such amines such as amino substituted terpenes and amino-alkyl-substituted piperazines. They are exemplified specifically by: propylenediamine, decamethylenediamine, octa-methylenediamine,2-methyl-pentanediamine,di(heptamethylene)triamine, tripropylenetetramine, trimethylenediamine, 1,3-bis(2-aminoethyl)imidazoline, 1,4-bis(2-aminoethyl)piperazine, and 1-(2-aminoethyl)piperazine (i.e., AEP). Higher homologues such as are obtained by condensing two or more of the above-illustrated alkylene amines likewise are useful. Examples of cycloalkylene amines include1,2-diaminocyclohexane,1,3-cyclohexanebis(-methylamine), isophoronediamine, menthanediamine (MDA), 4,4'-methylenebis(cyclohexylamine). Examples of aromatic polyamines include p-phenylenediamine (PPDA), m-phenylenediamine, 2,4-diaminotoluene, ethylenedianiline, 1,5-diaminonaphthalene, 1,8-diaminonaphthalene, methylenedianiline, and the like. Examples of highly preferred polyamines include EDA, DETA, TETA, TEPA, PEHA, methyl-pentanediamine, isophoronediamine, MDA, hexamethylenediamine, and iminobispropylamine, with AEP being highly preferred.

In addition, various amine-terminated polyethers, which are represented by the formula (POLYFUNCTIONAL AMINE FORMULA #2)

$H_2N+Alkylene-O-Alkylene)_{\overline{n}}NH_2$ can be utilized where n is an integer from about 2 to about 100, desirably from about 2 to about 70 and preferably from about 2 to about 5, and wherein each "Alkylene", independently, has from about 2 to about 10 carbon atoms with 2 carbon atoms, that is ethylene, or 3 carbon atoms, that is propylene, being preferred. The "Alkylene" group can be branched or straight Specific examples of such amine terminated polyethers include the Jeffamine D-Series produced by the Texaco Chemical Co. and have the formula (POLYFUNCTIONAL AMINE FORMULA #3)

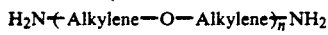

where n is an integer of from about 2 to about 100.

The various types of available Jeffamine D-Series products where n is an integer of from about 2 to about 100, include the following

| Product | n | Approx. Mol. Wt. |
|---|---|---|
| Jeffamine D-230 | 2-3 | 230 |
| Jeffamine D-400 | 5-6 | 400 |
| Jeffamine D-2000 | 33 | 2000 |
| Jeffamine D-4000 | 68 | 4000 |

Other types of amine terminated polyethers suitable for use are represented by the formula (POLYFUNCTIONAL AMINE FORMULA #4)

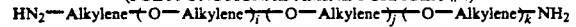

wherein each "Alkylene," independently, is set forth above, and wherein i plus k is an integer of from about 2 to about 25, desirably from about 2 to about 10 and preferably from about 2 to about 5. The number of repeating units represented by j is an integer of from about 1 to about 200, desirably from about 2 to about 150 and preferably from about 2 to about 10. Examples of such suitable polyethers include the Jeffamine ED-Series produced by the Texaco Chemical Co. and have the formula (POLYFUNCTIONAL AMINE FORMULA #5)

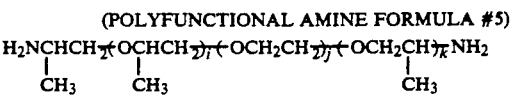

Examples of such specific Jeffamine ED-Series polymers include the following:

| Product | j | i + k | Approx. Mol. Wt. |
|---|---|---|---|
| Jeffamine ED-6008 | 8.5 | 2.5 | 600 |
| Jeffamine ED-900 | 15.5 | 2.5 | 900 |
| Jeffamine ED-2001 | 40.5 | 2.5 | 2,000 |
| Jeffamine ED-4000 | 86.0 | 2.5 | 4,000 |
| Jeffamine ED-6000 | 31.5 | 2.5 | 6,000 |

Still another type of suitable amine terminated polyethers which can be utilized are those generally represented by the formula (POLYFUNCTIONAL AMINE FORMULA #6)

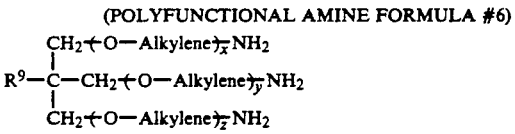

wherein each "Alkylene," independently, is as set forth above, that is, has from about 2 to about 10 carbon atoms therein with 2 or 3 carbon atoms being preferred. The total number of x+y+z integers is from about 2 to about 100, desirably from about 2 to about 10 and preferably from about 5 to about 10. $R^9$ is hydrogen or an aliphatic group with a desirable aliphatic group being an alkyl. When $R^9$ is an alkyl it has from about 1 to about 5 carbon atoms with 1 or 2 carbon atoms being preferred. Examples of such suitable polyethers include the Jeffamine T-Series produced by the Texaco Chemical Company and have the formula (POLYFUNCTIONAL AMINE FORMULA #7)

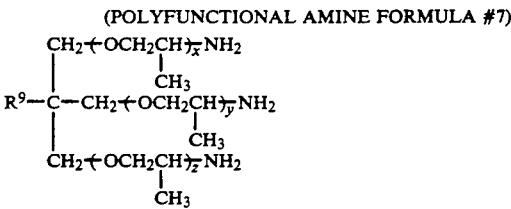

Examples of such specific Jeffamine T-Series include the following:

| Product | Approx. Value x + v + z | Approx. Mol. Wt. |
|---|---|---|
| Jeffamine T-403 | 5-6 | 440 |
| Jeffamine T-3000 | 50 | 3000 |
| Jeffamine T-5000 | 85 | 5000 |

The amount of the polyamine which is utilized on an equivalent weight basis with respect to the base statistical carboxyl-terminated polymer, is generally kept low. Larger amounts of the polyamine can be utilized, though such amounts tend to result in excess amine which acts as a co-cure agent and causes premature cure of the epoxy resin systems with which the statistical monofunctional amine-terminated reactive liquid polymers are used. Low polyamine amounts thus are highly desirable inasmuch as it produces a low viscosity statistical monofunctional amine-terminated compound such as a nitrile rubber, without too high an excess of polyamine which can cause premature cure of the epoxy resin systems. Such low amounts are on a mole basis of the polyamine to the statistical carboxyl-terminated monofunctional polymer is generally from about 1.0 to 5.0 moles, desirably from about 1.0 to 2.0, with from about 1.001 to about 1.30 moles being preferred.

The reaction product statistical monofunctional amine-terminated polymer is derived from the reaction product statistical monofunctional carboxyl-terminated polymer in the following manner. The polyamine is combined with the base monofunctional carboxyl-terminated polymer in an inert atmosphere such as nitrogen or argon at temperatures of from about 120° C. to about 200° C., and preferably from about 140° C to about 160° C. A condensation reaction takes place, and the purge is continuous with water being removed thereby. More specifically, the polyamine reacts with the carboxyl group(s) of the statistical monofunctional carboxyl-terminated polymers, thereby forming an amide group, and terminates the same with at least one amine end group. The statistical amine-terminated reactive liquid rubber polymer perhaps contains from about 5 percent to about 90 percent of the difunctional specie, from about 90 percent to about 5 percent of the non-functional specie, and about 5 percent to about 50 percent of the monofunctional specie; desirably from about 10 to about 50 percent of the difunctional specie, from about 10 to about 50 percent of the non-functional specie, and up to about 50 percent of the monofunctional specie; and preferably about 25 percent of the difunctional specie, about 25 percent of the non-functional specie, and about 50 percent of the monofunctional specie. The above ratios are generally with respect to utilizing an initial blend in forming the carboxyl-terminated species with approximately 50 mole percent of a difunctional initiator and 50 mole percent of a non-functional initiator. Thus, when the amounts of the difunctional initiator and the non-functional initiators are varied, the above ratios will vary, but it is to be understood that generally the amount of the monofunctional species, including the amine-terminated monofunctional specie, can vary generally up to 50 percent by weight and cannot be any higher.

It will be appreciated by one skilled in the art that the viscosity of the reaction or blended product statistical amine-terminated reactive liquid rubber polymers, which blending process was previously described hereinabove, that is the composition polymer, will vary depending upon the monomeric composition of the polymeric backbone PB, and in particular the acrylonitrile content of the polymer when the polymer is a nitrile rubber, that is, a copolymer of butadiene and acrylonitrile. As described above, the acrylonitrile content preferably is 16 percent. In any event, the viscosity is up to about 500,000 mPa's and desirably up to about 400,000 mPa's.

The greatest advantage provided by these polymers is that their viscosity is approximately at least ½ the value of an equivalent commercially known difunctional amine terminated polymer, enabling use of more of the desired co-cure agent. This is demonstrated by the measured viscosities summarized in the following Table III, which compares the viscosity of the inventive monofunctional versus difunctional amine-terminated polymers having the same compositions of butadiene homopolymers or butadiene/acrylonitrile copolymers.

TABLE III

| Carboxyl-Terminated Reactive Liquid Polymer | Polyamine | Ratio of Polyamine To Carboxyl Group | Visc. @ 27° C. (mPa's) | Amine Equivalent Weight and/or Free Amine |
|---|---|---|---|---|
| Difunctional | Aminoethylpiperazine | 1.9 | 200,000 | 1,000/5.2% |
| Difunctional | Aminoethylpiperazine | 1.2 | 528,000 | 1,600/1.2% |
| Blended Product Statistical Monofunctional | Aminoethylpiperazine | 1.2 | 130,000 | 3215/0.6% |
| Reaction Product Statistical Monofunctional | Aminoethylpiperazine | 1.2 | 110,000 | 3,300/0.6% |
| Difunctional | 2-Methylpentamethylene diamine | 3.0 | 100,000 | 480/9.9% |
| Statistical Monofunctional | 2-Methylpentamethylene diamine | 1.3 | 220,000 | 3,200/0.8% |
| Difunctional | Hexanediamine | 1.3 | >2,000,000 | —/1.6% |
| Statistical Monofunctional | Hexanediamine | 1.3 | 360,000 | 5,800/0.8% |

As discussed earlier hereinabove, the significantly lowered viscosity as illustrated in Table III attaches substantial advantages over known difunctional amine-terminated polymers. More particularly, the viscous difunctional amine polymers typically require warming to reduce their viscosity and render them more workable, especially in the field. The present inventive low viscosity statistical monofunctional amine-terminated polymers do not require warming prior to use and will be preferred for applications which must be performed at relatively lower ambient temperatures. Additionally, these polymers provide faster air release and better mixing. Therefore, these polymers will be preferred for applications involving mixing, which tends to entrap air, which must then be released before continuing, such as with on-site structural repair jobs.

As further illustrated in Table III, the statistical monofunctional amine-terminated reactive liquid polymers have higher amine equivalent weights than do corresponding difunctional amine-terminated polymers, which results in lower amounts of unreacted or excess polyamine. Such reduced amounts of unreacted polyamine reduces the co-curing action of the excess polyamine on the epoxy resin systems with which the statistical monofunctional amine-terminated polymers are used, thereby allowing greater latitude in the choice of a primary amine cure agent. In general, the statistical monofunctional amine-terminated polymers of the present invention have an unreacted or free amine content of from about 0.01 percent to about 15 percent by weight, and preferably from about 0.1 percent to about 2 percent by weight based upon the total weight of the polymer. These polymers have a number average molecular weight of from about 1,000 to about 13,000.

The present low viscosity amine-terminated monofunctional polymers are generally liquid although they may be solid and are useful as toughening and/or flexibilizing agents for any epoxy resin systems. Epoxy resin systems include, but are not limited to, sealants, caulks, and adhesives. Specific system applications include those at ambient temperatures as well as those rich in resin and those rich in rubber. Resin rich system applications include one and two part adhesives, especially adhesives made of thermoset resins such as epoxy, for uses including structural adhesives in the marine, automotive and aircraft industries; electrical and electronic potting compounds and encapsulants; cast pipe; sheet molding compound other than epoxy; and bulk molding compound. Castable rubber rich system applications include construction and civil engineering applications including roofing, flooring, water-impermeable membranes, and crack sealers.

The invention will be better understood by the following additional examples, which are directed to the formation of the amine-terminated form of the reaction and blended product statistical monofunctional polymers.

EXAMPLE 19 (REACTION PROCESS)

About 400 grams of reaction product statistical monofunctional carboxyl-terminated reactive liquid polymer C was mixed with 13.1 grams of hexanediamine in a two-liter, three-neck flask. The mole ratio of diamine to statistical monofunctional carboxyl-terminated polymer was approximately 1.3. The reactor was equipped with a mechanical stirrer and a Dean and Stark tube surmounted by a reflux condenser. A slight nitrogen purge was maintained on the system to remove water as the reaction progressed. The temperature was raised to 140° C. and the reaction was monitored by titration to measure the disappearance of carboxylic acid. The reaction was complete after five hours at which time a vacuum was applied to remove any residual water. The final reaction product statistical amine-terminated reactive liquid polymer had a viscosity of 61,000 mPa's at 27° C. and an Amine Equivalent Weight of 802 (Hydrogen Equivalent Weight=2901).

EXAMPLE 20 (REACTION PROCESS)

Following a procedure similar to that outlined above in Example 19, 609 grams of reaction product monofunctional carboxyl-terminated polymer C was reacted with 21.1 grams of 2-methylpentamethylene diamine. The ratio of diamine to monofunctional carboxyl-terminated polymer was approximately 1.3. The reaction required five hours at 150° C. The final reaction product statistical amine-terminated reactive liquid polymer had a viscosity of 197,000 mPa's at 27° C. and an Amine Equivalent Weight of 2924 (Hydrogen Equivalent Weight=1462).

EXAMPLE 21 (REACTION PROCESS)

Following a procedure similar to that outlined above in Example 19, 1057 grams of reaction product monofunctional carboxyl-terminated polymer C was reacted with 38.7 grams of aminoethylpiperazine. The ratio of diamine to monofunctional carboxyl-terminated polymer was approximately 1.2 The reaction required three hours at 140° C. A final reaction product statistical monofunctional amine-terminated reactive liquid polymer had a viscosity of 109,000 mPa's at 27° C. and an Amine Equivalent Weight of 3341 (Hydrogen Equivalent Weight $\approx$ 3,000).

EXAMPLE 21A (BLENDING PROCESS)

A blended product statistical monofunctional amine-terminated polymer was obtained in the following experiment. A non-functional polymer was prepared in the manner set forth above in Example 2A. About 250 grams of the non-functional polymer then was mixed with about 250 grams of a difunctional carboxyl-terminated polymer c in the manner also set forth above in Example 2A, to form a blended product statistical monofunctional carboxyl-terminated polymer The blended product statistical monofunctional carboxyl-terminated polymer then was reacted with 20.6 grams of aminoethylpiperizine. The ratio of diamine to carboxyl functionality in the blended product polymer was approximately 1.2. The reaction required 6 hours at 140° C. A final blended product statistical monofunctional amine-terminated reactive liquid polymer E, had a viscosity of 130,000 mpa's at 27° C. and an Amine Equivalent Weight of 3215 (Hydrogen Equivalent Weight $\approx$ 3,000).

The synthesized reaction or blended product statistical monofunctional amine-terminated reactive polymer can be reacted with a two-part thermoset epoxy resin system of the type previously described herein, which description is hereby fully incorporated by reference, to form the toughened cured epoxy resin of the present invention. The statistical monofunctional amine-terminated reactive polymer generally is not reacted with one-part thermoset epoxy resin systems of the type previously described herein.

As previously discussed herein, in a two-part thermoset epoxy resin system containing an amine curing agent, the epoxy resin and the curing agent are maintained physically separate until such time as it is desired to cure the epoxy resin. The equivalent weight ratio of the curing agent part to the epoxy resin part is from about 0.25 to about 5.0 and preferably from about 0.9 to about 1.1. In such two-part resin systems, the statistical monofunctional amine-terminated rubber, which can be in solid or desirably liquid form, preferably is admixed with the curing agent part of the system before introduction of the epoxy resin. Admixrubber with the epoxy resin part of the system with subsequent introduction of the curing agent into the admixture, is generally undesirable because the statistical monofunctional amine-terminated reactive polymer will prematurely cure the epoxy resin prior to introduction of the amine curing agent therein. The statistical monofunctional amine-terminated reactive solid or liquid rubbers are used in amounts of from about 2 to about 200 parts, desirably from about 2 to about 50 parts, and preferably from about 5 to about 25 parts per 100 parts of the epoxy resin. The admixing generally is carried out at ambient temperatures with no other special conditions being required.

Subsequent to admixture of the statistical monofunctional amine-terminated rubber and the amine curing agent part of the two-part epoxy resin system, the epoxy resin part of the system is combined with the amine-terminated rubber/curing agent admixture. The selected curing agent generally is capable of curing the admixture either at room temperature or at elevated temperatures of from about 50° C. to about 200° C., and preferably from about 80° C. to about 130° C. such elevated temperatures generally reduce curing time over cures conducted at room temperature. No other special conditions are necessary to carry out the curing reaction. Thus, the alternative modified epoxy resin of the present invention is produced and has the previously described following general structural formula:

It is to be noted that the selected curing agent cures the epoxy resin and statistical monofunctional amine-terminated rubber by chain-extending and crosslinking the epoxy groups of the epoxy resin to form a network.

This additional embodiment of the present invention will be better understood by reference to the following examples, which illustrate the unexpected mechanical and adhesive properties obtained in the present invention by comparing the performance of the statistical monofunctional amine-terminated polymers to conventional diamine-terminated polymers in a model two-part epoxy system.

EXAMPLE 22

A commercial amine-terminated butadiene acrylonitrile copolymer (1300×16 manufactured by B. F. Goodrich Co.) is hereinafter referred to as polymer e. Polymer e alone and various ratio blends of reaction product statistical monofunctional polymer E and polymer e, in a total amount of 100 parts, were each reacted with 100 parts DGEBA liquid epoxy in the presence of stoichiometric amounts of Ancamine MCA curing agent at room temperature for seven days to form a cured modified epoxy resin system. Each cured epoxy resin system produced from Recipes 19' to 22' then was tested for physical property data such as tensile strength and elongation as listed below in Table IV.

TABLE IV

| RECIPES | 19' | 20' | 21' | 22' |
|---|---|---|---|---|
| DGEBA Liquid Epoxy | 100 | 100 | 100 | 100 |
| Polymer E (16% Acrylonitrile) | — | 50 | 25 | 75 |
| Polymer e (16% Acrylonitrile) | 100 | 50 | 75 | 25 |
| Ancamine MCA | 42.1 | 45.5 | 44.2 | 47.4 |
| Physical Properties | | | | |
| Ten. Stg., Mpa | 21.1 | 17.3 | 16.6 | 12.2 |
| psi | 3060 | 2520 | 2420 | 1770 |
| Elongation, % | 68 | 67 | 69 | 34 |

The results show that blends of polymers E and e gave cured modified epoxy resin systems with no loss of elongation and a slight loss of tensile strength.

EXAMPLE 23

Polymer e alone and various ratio and amount blends of polymer E and polymer e were each reacted with 100 parts DGEBA liquid epoxy in the presence of Ancamine MCA curing agent at room temperature for seven days to form a cured modified epoxy resin system. Each cured epoxy resin system produced from Recipes 23 to 25 then was tested for physical properties such as tensile strength and elongation, as listed below in Table V.

TABLE V

| Recipes | 23 | 24 | 25 |
|---|---|---|---|
| DGEBA Liquid Epoxy | 100 | 100 | 100 |
| Polymer E (16% Acrylonitrile) | — | 150 | 100 |
| Polymer e (16% Acrylonitrile) | 300 | 150 | 200 |
| Ancamine MCA | 19.5 | 30.3 | 33.9 |
| Physical Properties | | | |
| Ten. Stg., MPa | 9.1 | 3.59 | 6.69 |
| psi | 1320 | 520 | 970 |
| Elongation, % | 152 | 101 | 112 |

The results show that polymer e used alone according to Recipe 23 results in a cured modified epoxy resin having better tensile strength and elongation than do the cured epoxy resins modified with both polymers E and e according to Recipes 24 and 25.

EXAMPLE 24

A reaction product monofunctional amine-terminated butadiene-acrylonitrile copolymer is hereinafter referred to as polymer F and a commercial difunctional amine-terminated butadiene-acrylonitrile copolymer (B. F. Goodrich 1300×21) is hereinafter referred to as polymer f. One hundred parts of polymer f was reacted with 100 parts of DGEBA liquid epoxy in the presence of 44.7 parts of ancamine MCA curing agent at room temperature for seven days to form a cured modified epoxy resin system. A blend of 50 parts each of polymers f and F also was reacted with 100 parts of DGEBA liquid epoxy in the presence of 47.3 parts of ancamine MCA at room temperature for seven days to form a cured modified epoxy resin system. Each cured epoxy resin system produced from Recipes 26 and 27 then was tested for physical properties such as tensile strength and elongation as listed below in Table VI.

TABLE VI

| Recipes | 26 | 27 |
|---|---|---|
| DGEBA Liquid Epoxy | 100 | 100 |
| Polymer f (10% Acrylonitrile) | 100 | 50 |
| Polymer F (10% Acrylonitrile) | — | 50 |
| Ancamine MCA | 44.7 | 47.3 |
| Physical Properties | | |
| Ten. Stg., MPa | 16.6 | 16 2 |
| psi | 2400 | 2350 |
| Elongation, % | 64 | 68 |

The results show that a cured epoxy resin system modified with statistical monofunctional and difunctional amine-terminated reactive polymers F and f, respectively, according to Recipe 27 gave similar tensile strength and elongation properties to a cured epoxy resin system modified only with the difunctional amine-terminated polymer f according to Recipe 26.

EXAMPLE 25 (CONTROL)

A control sample cured thermoset epoxy resin system was prepared by reacting 35.8 parts of a curing agent Ancamide 501 with 100 parts of DGEBA liquid epoxy in the presence of 40 parts of tabular alumina at 125° C. for one hour. The control recipe appears in Table VII immediately below.

TABLE VII

| Control Recipe | 28 |
|---|---|
| DGEBA Liquid Epoxy | 100 |
| Tabular Alumina | 40 |
| Ancamide 501 | 35.8 |
| Adhesive Properties - CRS | |
| LAP Shear, psi | 749 |
| T-Peel, pli | 5.1 |
| Tg, °C. | — |
| Adhesive Properties - EGS | |
| Lap Shear, psi | 816 |
| T-Peel, pli | 6.7 |
| Tg, °C. | — |

The cured epoxy resin system prepared in Example 25 was tested for adhesive properties such as lap shear and T-peel on cold-rolled steel (CRS) and on electrogalvanized steel (EGS), the results of which are set forth above in Table VII.

EXAMPLE 26

A reaction product statistical monofunctional amine-terminated reactive polymer G was prepared by reacting 751.9 grams of monofunctional carboxyl-terminated polymer D with 28.3 grams of aminoethylpiperazine, wherein the ratio of diamine to monofunctional carboxyl-terminated polymer was approximately 1.2. The reaction required 7.5 hours at 140° C. A commercial statistical difunctional amine-terminated reactive butadiene-acrylonitrile copolymer (B. F. Goodrich 1300x35) is hereinafter designated polymer g. Twenty-five parts of polymer G was reacted with 100 parts DGEBA liquid epoxy in the presence of 40 parts of tabular alumina and 34.8 parts of a curing agent ancamide 501 according to Recipe 29 set forth below in Table VIII. Twenty-five parts of polymer g was also reacted with 100 parts of DGEBA liquid epoxy in the presence of 40 parts of tabular alumina and 34.7 parts of a curing agent ancamide 501 according to Recipe 30. Table VIII compares the adhesive properties obtained after curing of Recipes 29 and 30 for one hour at 125° C. on both cold-rolled steel and electrogalvanized steel to form a cured modified epoxy resin.

TABLE VIII

| RECIPE | 29 | 30 |
|---|---|---|
| DGEBA Liquid Epoxy | 100 | 100 |
| Tabular Alumina | 40 | 40 |
| Polymer G | 25 | — |
| (26% Acrylonitrile) | | |
| Polymer g | — | 25 |
| (26% Acrylonitrile) | | |
| Ancamide-501 | 34.8 | 34.7 |
| Adhesive Properties - CRS | | |
| Lap Shear, psi | 1360 | 1240 |
| T-Peel, pli | 12.2 | 12.6 |
| Adhesive Properties - EGS | | |
| Lap Shear, psi | 1450 | 1510 |
| T-Peel, pli | 11.0 | 16.3 |

The results show that a cured epoxy resin system according to Recipe 29 modified with a statistical monofunctional amine-terminated reactive polymer G gave comparable adhesive properties such as lap shear and T-peel when cured on both cold-rolled steel and electrogalvanized steel, to a cured epoxy resin system according to Recipe 30 modified with a statistical difunctional amine-terminated polymer g.

EXAMPLE 27

As shown below in Table IX, a Recipe 31 was prepared by reacting 25 parts of statistical monofunctional amine-terminated reactive polymer E with 100 parts of DGEBA liquid epoxy in the presence of 40 parts of tabular alumina and 35.3 parts of ancamide 501 curing agent. A Recipe 32 was prepared by reacting 25 parts of statistical difunctional amine-terminated reactive polymer e with 100 parts of DGEBA liquid epoxy in the presence of 40 parts tabular alumina and 34.0 parts of ancamide 501. Each recipe then was cured for one hour at 125° C. on both cold-rolled steel and electrogalvanized steel to form a cured modified epoxy resin system. Table IX compares the adhesive properties such as Lap shear and T-peel for each cured modified epoxy resin system.

TABLE IX

| Recipes | 31 | 32 |
|---|---|---|
| DGEBA Liquid Epoxy | 100 | 100 |
| Tabular Alumina | 40 | 40 |
| Polymer E | 25 | — |
| (16% Acrylonitrile) | | |
| Polymer e | — | 25 |
| (16% Acrylonitrile) | | |
| Ancamide 501 | 35.3 | 34.0 |
| Adhesive Properties - CRS | | |
| Lap Shear, psi | 1320 | 1470 |
| T-peel, pli | 14.4 | 16.4 |
| Adhesive Properties - EGS | | |
| Lap Shear, psi | 1040 | 1400 |
| T-Peel, pli | 8.6 | 15.1 |

The results show that a cured epoxy resin system according to Recipe 31 modified with a statistical monofunctional amine-terminated reactive polymer E gave similar adhesive properties such as lap shear and T-peel to a cured epoxy resin system according to Recipe 32 modified with a statistical difunctional amine-terminated reactive polymer e when cured on cold-rolled steel.

EXAMPLE 27A

As shown below in Table IXa, a recipe 31' was prepared by reacting 25 parts of difunctional amine-terminated polymer e with 100 parts of DGEBA liquid epoxy in the presence of 40 parts of tabular alumina and 34 parts of Ancamide 501 curing agent. A recipe 32' was prepared by reacting a blended product statistical monofunctional amine-terminated reactive liquid polymer comprising a blend of 15 parts of difunctional polymer e and 10 parts of the non-functional polymer, with 100 parts of DGEBA liquid epoxy in the presence of 40 parts of tabular alumina and 34.7 parts of Ancamide 501 curing agent. The recipe 32'' was prepared by reacting 25 parts of blended product statistical monofunctional amine-terminated reactive polymer comprising 10 parts of difunctional polymer e and 15 parts of non-functional polymer with 100 parts of DGEBA liquid epoxy in the presence of 40 parts of tabular alumina and 35.1 parts of Ancamide 501 curing agent. Each recipe was then cured for 1 hour at 125° C. on cold-rolled steel to form a cured modified epoxy resin system. Table IXa compares adhesive properties such as lap shear and T-peel for each cured modified epoxy resin system.

TABLE IXa

| Recipe | 31' | 32' | 32' |
|---|---|---|---|
| DGEBA Liquid Epoxy | 100 | 100 | 100 |
| Tabular Alumina | 40 | 40 | 40 |
| Difunctional Amine-Terminated Polymer e (16% Acrylonitrile) | 25 | 15 | 10 |
| Non-functional Polymer (26% Acrylonitrile) | 0 | 10 | 15 |
| Ancamide 501 | 34.0 | 34.7 | 35.1 |
| ADHESIVE PROPERTIES - CRS | | | |
| Lap Shear, psi | 1470 | 1400 | 1450 |
| T-peel, pli | 16.4 | 21.8 | 18.0 |

The results show that a cured epoxy resin system prepared according to recipes 32, and 32,, and modified with a blended product statistical monofunctional amine-terminated reactive polymer, gave comparable adhesive properties such as lap shear and T-peel when cured on cold-rolled steel, to a cured epoxy resin system' prepared according to recipe 31' and modified with a statistical difunctional amine-terminated polymer e. The results further show that a blended product statistical monofunctional amine-terminated polymer formed from difunctional and non-functional polymers having different acrylonitrile contents (i.e., the difunctional polymer e containing 16 percent acrylonitrile and the non-functional polymer containing 26 percent acrylonitrile) is an effective modifier in a cured epoxy resin system.

The reaction product statistical monofunctional epoxy-terminated reactive polymer alternatively utilized in the present invention to react with the epoxy resin is synthesized in the following manner.

The reaction product statistical monofunctional carboxyl-terminated polymer is once again utilized. The preparation, structure, formulation, and the like of the statistical carboxyl-terminated prepolymer is set forth hereinabove and accordingly is fully incorporated by reference with regard to the structure, formulation, and preparation thereof. Inasmuch as the reaction product statistical epoxy-terminated polymer composition is prepared by reacting one or more epoxy resin terminators as set forth hereinbelow with a reaction product statistical monofunctional carboxyl-terminated polymer composition, the actual composition will contain various monofunctional epoxy-terminated polymers which can be represented by the general structural formula

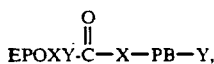
EPOXY-C—X—PB—Y, various difunctional polymers which can be represented by the general structural formula

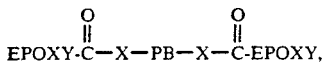
EPOXY-C—X—PB—X—C-EPOXY, and various non-functional polymers which can be represented by the general structural formula Y—PB—Y, wherein X, PB, and Y are as set forth hereinabove, and wherein EPOXY is an epoxy resin terminator which is reacted with the reaction product statistical monofunctional carboxyl-terminated polymer composition. Naturally, it is to be understood that during reaction with the statistical monofunctional carboxyl-terminated composition, a ring opening reaction takes place. The reaction between the epoxy resin terminator and the statistical monofunctional carboxyl-terminated polymer composition which will be described in more detail hereinbelow generally takes place in the presence of an inert atmosphere at elevated temperatures utilizing small amounts of catalysts.

Considering the "EPOXY" group, it is generally an epoxy resin terminator usually known to the art and to the literature and can be various commercially available epoxy resins. Examples of specific epoxy resins or polymers which can be utilized include: polyhydric phenol polyether alcohols; glycidyl ethers of novolac resins such as epoxylated phenol-formaldehyde novolac resin; glycidyl ethers of mono-, di-, and trihydric phenols; glycidyl ethers of bisphenols such as diglycidyl ether of tetrabromobisphenol A; glycidyl ethers of polynuclear phenols; epoxy resin made from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2,3-epoxypropyl)methylpropylammonium p-toluenesulfonate; glycidyl triazines; thioglycidyl resins such as epoxidized bisulfide; silicon-glycidyl resins such as 1,4-bis[(2,3-epoxypropoxy)dimethylsilyl]; and fluorine glycidyl resins. Other epoxy resins which can be used include those which are synthesized from mono-epoxies other than epihalohydrins including epoxy resins made from unsaturated monoepoxies such as polyallyl glycidyl ether and glycidyl sorbate dimer; epoxy resins from monoepoxy alcohols; epoxy resins from monoepoxies by ester interchange; epoxy resins from glycidaldehyde; polyglycidyl compounds containing unsaturation such as allyl-substituted diglycidyl ether of bisphenol A; epoxy-resin adducts of the above; and epoxy resins which are synthesized from olefins and chloroacetyls such as butadiene dioxide, vinylcyclohexene dioxide, epoxidized polybutadiene, and bis(2,3-epoxycyclopentyl)ether. A more comprehensive list of epoxy resins can be found in *Handbook of Epoxy Resins*, By Henry Lee and Kris Neville, McGraw-Hill, Inc., 1967, which is hereby incorporated by reference.

A highly preferred epoxy resin terminator is diglycidyl ether of bisphenol A (DGEBA) which has the following formula:

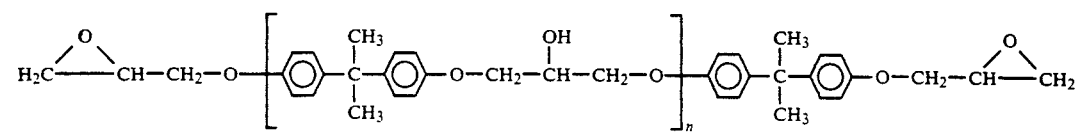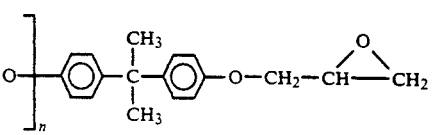

wherein n is an integer from 0 to 18, desirably from 0 to 14.3, and preferably from 0 to 5.5.

The various epoxy resins or polymers generally have a number average molecular weight of from about 200 to about 13,000. The various epoxy polymers generally are difunctional, that is, they have two epoxide groups typically at the terminal portions thereof. The amount of the epoxy resin terminator utilized is such that the mole ratio of epoxy resin terminator to the statisitical carboxyl-terminated monofunctional polymer is generally in excess, as from about 0.90 to about 40, desirably from about 0.90 to about 20, and preferably from about 0.95 to about 1.05. Thus, free epoxy resins will generally exist within the reaction product statistical monofunctional epoxy-terminated reactive liquid rubber polymeric compositions.

Reaction of the various epoxy resin or polymer terminators with the reaction product statistical carboxyl-terminated reactive polymers generally occurs at elevated temperatures in the presence of an inert atmosphere. Generally, any inert gas can be utilized such as nitrogen, argon, and the like. The reaction generally occurs at temperatures of from about 80° C. to about 180° C., desirably from about 90° C. to about 140° C., and preferably from about 90° C. to about 120° C., generally in the presence of ambient or normal atmospheric temperature. In order to promote reaction, conventional epoxy catalysts are optionally utilized.

One group of catalysts which can be utilized are the various organic phosphines having from 3 to 40 carbon atoms which include various alkyl, various aromatic, various alkyl substituted aromatic, etc., phosphines such as triphenylphosphine, diethylphenylphosphine, dimethylphenylphosphine, tribenzylphosphine, tri-n-butylphosphine, tri-t-butylphosphine, tricyclohexylphosphine, triethyl-phosphine, trimethylphosphine, tri-n-octylphosphine, triphenylphosphine, tris(3-chlorophenyl)phosphine, tris(4-chlorophenyl)phosphine, tris(4-fluorophenyl)phosphine, tris(2-hydroxyphenyl)-phosphine, tris(3-methoxyphenyl)phosphine, tris(4-methoxyphenyl)phosphine, tris(2-tolyl)phosphine, and tris(3-tolyl)phosphine. A second type of catalyst are the various tertiary amines wherein the hydrocarbyl portion is generally an aliphatic and preferably an alkyl group, an aromatic group, or an aliphatic substituted aromatic, or an aromatic substituted aliphatic group, having a total of from about 1 to about 10 carbon atoms with from about 1 to about 6 carbon atoms being preferred. Examples of specific tertiary amine catalysts include benzyl dimethyl amine, trimethyl amine, triethylamine, and the like. Another group of suitable catalysts are the various alkyltriphenylphosphonium ester or halide salts wherein the alkyl group generally has from 1 to about 10 carbon atoms, and wherein iodide is the preferred halide salt. Examples of such specific catalysts include ethyltriphenylphosphonium acetate, ethyltriphenylphosphonium iodide, n-hexyltriohenylphosphonium bromide, isobutyltriphenylphosphonium bromide, isopropyltriphenylphosphonium bromide.

As noted, although generally desired, the catalysts are optional and hence may not be utilized. When utilized, the amount thereof is generally up to about 1 percent by weight based upon a total weight of the epoxy resin terminator and the statistical monofunctional carboxyl-terminated reactive polymer, desirably up to about 0.5 percent by weight, and preferably from about 0.001 to about 0.1 percent by weight.

In order to reduce the level of residual reactions, the formed reaction product statistical monofunctional epoxy-terminated reactive polymers desirably have a low acid number, such as 2.0 or less, and preferably 0.4 or less. Moreover, the epoxy-terminated reactive polymers also have very low viscosities, such as generally less than 2,000,000 mPa's, desirably 1,000,000 mPa's or less, and preferably 500,000 mPa's or less.

Inasmuch as the epoxy resin terminators react with available carboxyl-terminated functional end groups, the overall make-up or content of the reaction product statistical epoxy-terminated reactive liquid rubber polymers will generally contain the same ratios or amounts of reactive epoxy-terminated end groups as the reaction product statistical carboxyl-terminated polymers. Thus, if the statistical carboxyl-terminated polymers are made utilizing approximately 50 percent of a difunctional initiator and 50 percent of a nonfunctional initiator, the statistical epoxy-terminated polymers will contain generally from about 5 percent to about 90 percent of the difunctional specie, from about 90 to about 5 percent of the difunctional specie, and from about 5 percent to about 50 percent of the monofunctional specie; desirably from about 10 to about 5o percent of the difunctional specie, from about 10 to about 50 percent of the nonfunctional specie, and up to about 50 percent of the monofunctional specie; and preferably about 25 percent of the difunctional specie, about 25 percent of the nonfunctional specie, and about 50 percent of the monofunctional specie. Hence, as noted above, it is termed a statistical epoxy-terminated monofunctional reactive liquid rubber polymer composition. The ratios of the various species of the statistical polymer will vary depending upon the amount of initiators generally utilized and hence the amount of the difunctional or nonfunctional species can vary widely with the amount of the monofunctional specie can generally not be greater than 50 percent.

The reaction or blended product statistical monofunctional epoxy-terminated polymers of the present invention, which blending process was previously described hereinabove, are generally liquid but can also be solid and have significantly lower viscosities than heretofore conventional but difunctional epoxy-terminated polymers, which render them more workable, especially in the field. Suitable applications include ambient temperature use as well as use in association with epoxy resins and structural adhesives in the marine, automotive, and aircraft industries; electrical and electronic prodding compounds and encapsulants; cast pipe; sheet molding compounds, boat molding compounds, and the like. They can also be utilized as castable systems in construction and civil engineering applications such as roofing, flooring, water-impermeable membranes, cracks sealers, and the like.

The invention will be better understood by reference to the following further examples, which are directed to the formation of the epoxy-terminated form of the reaction and blended product statistical monofunctional polymers.

EXAMPLE 28 (REACTION PROCESS)

To a suitably sized reaction vessel was charged 400 grams of polymer C and 34.7 grams of Epon 828, that is, DGEBA, at a molar ratio of approximately 1:1. 0.05 grams of triphenyl phosphine was added as a catalyst. In the presence of a nitrogen blanket, the temperature of the reaction vessel was raised to approximately 130° C. and the reaction continued until the acid number was generally less than 0.6. The reaction time was approximately 20 hours to reach completion. The reaction product statistical epoxy-terminated reactive polymer had a viscosity of 339,000 mPa's at 27° C. In contrast, a similar reaction utilizing a difunctional carboxyl-terminated reactive polymer yielded a viscosity in excess of 2,000,000.

EXAMPLE 29 (REACTION PROCESS)

An epoxy-terminated reactive polymer H was made utilizing the same procedure as in Example 28 except that Polymer D and 600 grams of Epon 828 was utilized. The molar ratio was thus approximately 17.3. No catalyst was utilized and the reaction was completed in about 4.5 hours. The reaction product statistical epoxy-terminated reactive polymer had a viscosity of 91,000 mPa's at 27° C. In contrast, a control utilizing the same reactants and amounts except that a difunctional carboxyl-terminated reactive polymer was utilized, yielded a product having a viscosity of from about 300,000 to about 600,000 mPa's at 25° C.

EXAMPLE 30 (REACTION PROCESS)

In a suitably sized reaction vessel was added equal parts by weight of polymer D and the diglycidyl ether of cyclohexane dimethanol. Under a blanket of nitrogen, the reaction temperature was raised to 130° C. and reacted until the Acid No. was <0.6. The reaction required 4.5 hours to reach completion. The final statistical monofunctional epoxy-terminated reaction product had a viscosity of 8600 mPa's at 27° C. (The same reaction with a standard difunctional RLP gives an adduct with a viscosity of 15,000–25,000 mPa's at 25° C.) Molar Ratio RLP/Epoxy—1:8.6

EXAMPLE 31 (REACTION PROCESS)

In a suitably sized reaction vessel was added 200 parts by weight of polymer D and 300 parts of an epoxy novolac (such as DEN-438). Under a blanket of nitrogen was added 2.5 grams (0.5 weight percent) of phosphonium iodide and the reaction temperature was raised to 100° C. The reaction required only 1 hour to reach the desired end point of no titratable acid. The final statistical monofunctional epoxy-terminated adduct had a viscosity of 160,000 mPa's at 50° C. and 1,980,000 mpa's at 27° C. (There is no comparable adduct with a difunctional RLP).

EXAMPLE 31A (BLENDING PROCESS)

A blended product statistical monofunctional epoxy-terminated polymer was obtained in the following experiment.

A difunctional epoxy-terminated reactive polymer was made utilizing the procedure of Example 28, except that polymer c and 600 grams of Epon 828 was utilized. The molar ratio was thus approximately 17.3. No Catalyst was used and the reaction was complete in about 5 hours. About 400 grams of a non-functional polymer then was added to the reaction product to form the blended product statistical monofunctional epoxy-terminated reactive polymer. The final product had a viscosity of from about 150,000 to about 230,000 mPa's at 25° C.

The reaction or blended product synthesized statistical monofunctional epoxy-terminated reactive polymer used in the present invention can be reacted with either a two-part thermoset epoxy resin system or a one-part thermoset epoxy resin system of the type previously described herein, which description is hereby fully incorporated by reference.

If the epoxy resin is part of a two-part thermoset epoxy resin system containing an amine curing agent, the epoxy resin and the curing agent are maintained physically separate until such time as it is desired to cure the epoxy resin, as previously discussed. The equivalent weight ratio of the curing agent part to the epoxy resin part is from about 0.25 to about 5.0 and preferably from about 0.9 to about 1.1. In such two-part epoxy resin systems, the statistical monofunctional epoxy-terminated reactive polymer, which is in solid or desirably liquid form, preferably is admixed with the epoxy part of the system before introduction of the curing agent. Admixture of the statistical monofunctional epoxy-terminated reactive polymer with the curing agent part of the system with subsequent combining with the epoxy resin part of the system, generally is undesirable because it would result in premature curing of the epoxy-terminated reactive polymer. The statistical monofunctional epoxy-terminated rubber is utilized in amounts of from about 2 to about 200 parts, desirably from about 2 to about 75 parts, and preferably from about 5 to about 30 parts per 100 parts of the epoxy resin. The admixing generally is carried out at ambient temperatures with no other special conditions being required.

Subsequent to admixture of the statistical monofunctional epoxy-terminated rubber and the epoxy resin part of the two-part epoxy resin system, the curing agent part of the system is combined with the epoxy-terminated rubber/epoxy resin admixture. The selected curing agent generally is capable of curing the admixture either at room temperature or at elevated temperatures of from about 50° C. to about 200° C., and preferably from about 80° C to about 130° C. Such elevated temperatures generally reduce curing time over cures conducted at room temperature. No other special conditions are necessary to carry out the curing reaction. The alternative modified epoxy resin of the present invention thus is formed and has the previously described following general structure formula:

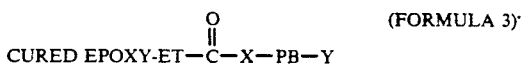

(FORMULA 3)

It is to be noted that the selected curing agent cures the above-described pre-cure low viscosity blend of epoxy resin and statistical monofunctional epoxy-terminated rubber by chain extending and crosslinking the epoxy groups of the epoxy resin to form a network.

This alternative embodiment of the present invention will be better understood by the following examples, which illustrate the unexpected adhesive properties obtained in the present invention by comparing the performance of the statistical monofunctional epoxy-terminated polymers to conventional diepoxy-terminated polymers in model one- and two-part epoxy system.

EXAMPLE 32

Twenty-five parts of reaction product statistical monofunctional epoxy-terminated reactive polymer H was reacted with 98.5 parts of DGEBA liquid epoxy, with the adduct containing 91 percent rubber, in the presence of 40 parts of tabular alumina and 35.6 parts of ancamide 501 curing agent. Recipe 33 then was cured for one hour at 125° C. on both cold-rolled steel and electrogalvanized steel to form a cured modified epoxy resin system. Table X below compares the adhesive properties of the cured modified epoxy resin system.

TABLE X

| RECIPE | 33 |
|---|---|
| DGEBA Liquid Epoxy | 98.5 |
| Tabular Alumina | 40 |
| Polymer H | 25 |
| (26% Acrylonitrile) | |
| Ancamide 501 | 35.6 |
| Adhesive Properties - CRS | |
| Lap Shear, psi | 1610 |
| T-Peel, pli | 16 |
| Adhesive Properties - EGS | |
| Lap Shear, psi | 1600 |
| T-Peel, pli | 17.8 |

The results show that a cured epoxy resin system modified with a reaction product statistical monofunctional epoxy-terminated reactive polymer H exhibited superior adhesive properties such as lap shear and T-peel on both cold-rolled steel and electrogalvanized steel as compared to the control sample of Example 25 in Table VII above for an unmodified cured epoxy resin system.

As previously discussed herein, if the epoxy resin is part of a one-part thermoset epoxy resin system containing a latent cure agent, that is a cure agent which is unreactive or stable at ambient temperatures, the equivalent weight ratio of the curing agent to the epoxy resin is from about 0.25 to about 5.0 and preferably from about 0.9 to about 1.1. The statistical monofunctional epoxy-terminated reactive polymer in solid or preferably liquid form is combined with the one-part thermoset epoxy resin system containing the epoxy resin and the latent curing agent. The statistical monofunctional epoxy-terminated rubber is generally utilized in amounts of from about 2 parts to about 200 parts, desirably from about 2 to about 75 parts, and preferably from about 5 parts to about 30 parts per 100 parts of the epoxy resin. The curing agent of the one-part system typically is latent at room temperature, but provides rapid cures of the statistical monofunctional epoxy-terminated rubber and the epoxy resin at temperatures of from about 50° C. to about 200° C., and preferably from about 130° C. to about 150° C., in the presence of accelerators such as monuron, nonuron, or diurion. No other special conditions are necessary for carrying out the curing reaction. Thus, by this process, a modified epoxy resin of the present invention having the following aforementioned general structural formula is produced:

It is to be noted that the selected latent curing agent cures the above-described epoxy resin and statistical monofunctional epoxy-terminated rubber by chain extending and crosslinking the epoxy groups of the epoxy resin to form a network.

This alternative embodiment of the present invention will be better understood by referring to the following examples, which illustrate the unexpected adhesive properties obtained in the present invention by comparing the performance of the reaction product and blended product statistical monofunctional epoxy-terminated polymers to conventional diepoxy-terminated polymers in a model one-part epoxy system.

EXAMPLE 33 (CONTROL)

A control sample cured thermoset epoxy resin system was prepared by admixing at room temperature 6 parts of micropulverized dicyandiamide with 100 parts of DGEBA liquid epoxy in the presence of 40 parts of tabular alumina, 3.5 parts of fumed silica, and 2 parts of 3-phenyl-1,1-dimethyl urea. The control sample according to Recipe 34 in Table XI below then was cured both on oily cold-rolled steel and oily electrogalvanized steel to form a cured epoxy resin system. Table XI lists the adhesive properties of the cured epoxy resin system on both substrates

TABLE XI

| CONTROL RECIPE | 34 |
|---|---|
| DGEBA Liquid Epoxy | 100 |
| Tabular Alumina - $Al_2O_3$ | 40 |
| Fumed silica | 3.5 |
| Dicyandiamide | 6 |
| 3-phenyl-1,1-dimethyl urea | 2 |
| Adhesive Properties - OCRS | |
| Average Lap Shear, psi | 1230 |
| Average T-peel, pli | 12.3 |
| Tg, °C. | 128 |
| Adhesive Properties - OEGS | |
| Average Lap Shear, psi | 1190 |
| Average T-peel, pli | 12.7 |
| Tg, °C. | 130 |

The results show that the control sample for the cured thermoset epoxy resin system gave typical adhesive properties and glass transition temperatures for unmodified epoxy resin systems on either oily cold-rolled steel or oily electrogalvanized steel.

EXAMPLE 34

A commercial statistical difunctional epoxy-terminated butadiene-acrylonitrile copolymer (Hi-TEK 58006) is hereinafter designated polymer i. A reaction product statistical monofunctional epoxy-terminated reactive polymer K and a statistical difunctional epoxy-terminated reactive polymer j were prepared in the following manner. The statistical difunctional epoxy-terminated polymer j was prepared by charging a suitably sized reaction vessel with 1800 grams of polymer c and 362.5 grams of Epon 828 at a molar ratio of approximately 1:2, with the rubber content of the adduct being 83.5 percent. In the presence of a nitrogen blanket, the temperature of the reaction vessel was raised to approximately 130' C. and the reaction continued until the acid number was generally less than 2. The reaction time took approximately six hours to reach completion. The reaction product statistical monofunctional epoxy-terminated polymer K was prepared by charging a suitably sized reaction vessel with 1,000 grams of polymer C and 88.5 grams of Epon 828 at a molar ratio of approximately 1:1, with the rubber content of the adduct being 91 percent. In the presence of a nitrogen blanket, the temperature of the reaction vessel was raised to approximately 130° C. and the reaction continued until the acid number was generally less than 1.5. The reaction time took approximately six hours to reach completion.

Various amounts of each polymer i, j, and K were each reacted with various amounts of DGEBA liquid epoxy in the presence of 40 parts of tabular alumina, 3.5 parts of fumed silica, 2 parts of 3-phenyl-1,1-dimethylurea, and 6 parts of a latent curing agent dicyandiamide, per Recipes 35 to 40 below in Table XII. Each recipe then was cured for one hour at 170° C. both on oily cold-rolled steel and oily electrogalvanized steel to form a cured modified epoxy resin system. Table XII lists the adhesive properties of each cured modified epoxy resin system according to Recipes 35-40 on both substrates.

mide according to Recipes 41 to 46 below in Table XIII. Each recipe then was cured for one hour at 170° C. both on oily cold-rolled steel and oily electrogalvanized steel to form a cured modified epoxy resin system. Table XIII lists the adhesive properties of each cured modified epoxy resin system according to Recipes 41 to 46 on both substrates.

TABLE XIII

| RECIPES | 41 | 42 | 43 | 44 | 45 | 46 |
|---|---|---|---|---|---|---|
| DGEBA Liquid Epoxy | 85 | 77.5 | 99 | 98.5 | 85 | 77.5 |
| Polymer L (26% Acrylonitrile) | 25 | 37.5 | — | — | — | — |
| Polymer H (26% Acrylonitrile) | — | — | 11 | 16.5 | — | — |
| Polymer n (26% Acrylonitrile) | — | — | — | — | 25 | 37.5 |
| Tabular Alumina | 40 | 40 | 40 | 40 | 40 | 40 |
| Fumed Silica | 3.5 | 3.5 | 3.5 | 3.5 | 3.5 | 3.5 |
| Dicyandiamide | 6.0 | 6.0 | 6.0 | 6.0 | 6.0 | 6.0 |
| 3-phenyl-1,1-dimethyl urea | 2.0 | 2.0 | 2.0 | 2.0 | 2.0 | 2.0 |
| ADHESIVE PROPERTIES-OCRS | | | | | | |
| Lap Shear, psi | 1300 | 1400 | 1350 | 1460 | 1660 | 1660 |
| T-Peel, pli | 27.7 | 24.7 | 22.8 | 25.2 | 30.7 | 35.1 |
| ADHESIVE PROPERTIES-OEGS | | | | | | |
| Lap Shear, psi | 1140 | 1190 | 1210 | 1277 | 1610 | 1630 |
| T-Peel, pli | 17.8 | 17.7 | 22.3 | 21.3 | 32.0 | 33.3 |
| $T_g$ Cured Adhesive °C. | 124 | 124 | 125 | 125 | 123 | 122 |

TABLE XII

| RECIPES | 35 | 36 | 37 | 38 | 39 | 40 |
|---|---|---|---|---|---|---|
| DGEBA Liquid Epoxy | 90 | 77.5 | 98 | 97 | 99 | 98.5 |
| Polymer i (16% Acrylonitrile) | 25 | 37.5 | — | — | — | — |
| Polymer j (16% Acrylonitrile) | — | — | 12 | 18 | — | — |
| Polymer k (16% Acrylonitrile) | — | — | — | — | 11 | 16.5 |
| Tabular Alumina | 40 | 40 | 40 | 40 | 40 | 40 |
| Fumed Silica | 3.5 | 3.5 | 3.5 | 3.5 | 3.5 | 3.5 |
| Dicyandiamide | 6.0 | 6.0 | 6.0 | 6.0 | 6.0 | 6.0 |
| 3-phenyl-1,1-dimethyl urea | 2.0 | 2.0 | 2.0 | 2.0 | 2.0 | 2.0 |
| ADHESIVE PROPERTIES-OCRS | | | | | | |
| Lap Shear, psi | 1520 | 1660 | 1590 | 1720 | 1510 | 1300 |
| T-Peel, pli | 28.3 | 33.3 | 30.2 | 29.3 | 27.8 | 23.2 |
| ADHESIVE PROPERTIES-OEGS | | | | | | |
| Lap Shear, psi | 1510 | 1500 | 1740 | 1630 | 1410 | 1350 |
| T-Peel, pli | 25.2 | 26.3 | 31.5 | 23.5 | 21.2 | 19.2 |
| $T_g$ Cured Adhesive °C. | 127 | 125 | 126 | 124 | 126 | 127 |

The results show that generally comparable adhesive properties such as lap shear, T-peel and glass transition temperature are obtained on both oily cold-rolled steel and oily electrogalvanized steel for cured epoxy resin systems modified with the statistical monofunctional epoxy-terminated reactive polymer K according to Recipes 39 and 40 in Table XII above, as compared to cured epoxy resin systems modified with statistical difunctional epoxy-terminated reactive polymers i and j according to Recipes 35 to 38.

The results show that generally comparable adhesive properties are obtained on both oily cold-rolled steel and oily electrogalvanized steel for cured epoxy resin systems modified with the reaction product statistical monofunctional epoxy-terminated reactive polymers L and H, according to Recipes 41 to 44 in Table XIII above as compared to cured epoxy resin systems modified with statistical difunctional epoxy-terminated reactive polymer n according to Recipes 45 and 46.

EXAMPLE 35

A commercial statistical difunctional epoxy-terminated butadiene-acrylonitrile copolymer (Hi-Tek 15 58005) is hereinafter designated polymer n. A reaction product statistical monofunctional epoxy-terminated polymer L was prepared in the following manner. To a suitably sized reaction vessel was added 40 parts by weight of polymer D and 60 parts by weight of Epon 828. The molar ratio was approximately 1:17. No catalyst was utilized and the reaction was completed in about 4.5 hours.

Various amounts of each polymer L, H, and n were each reacted with various amounts of DGEBA liquid epoxy in the presence of 40 parts of tabular alumina, 3.5 parts of fumed silica, 2 parts of 3-phenyl-1,1-dimethyl urea, and 6 parts of the latent curing agent dicyandiamide

EXAMPLE 36

A reaction product statistical monofunctional epoxy-terminated reactive polymer O was prepared by charging a suitably sized reaction vessel with 600 grams of polymer C and 175.5 grams of solid epoxy EPON 1002, at a molar ratio of approximately 1:1, with the rubber content of the adduct being 77.4 percent. Ethyl triphenylphosphonium iodide in an amount of 0.8 grams was added as a catalyst. In the presence of a nitrogen blanket, the temperature of the reaction vessel was raised to approximately 160° C. and the reaction continued until the acid number was generally less than 2. The reaction time was approximately 2 hours to reach completion. Recipes 47 and 48 shown below in Table XIV were prepared by reacting 10 parts and 15 parts, respectively, of the statistical monofunctional epoxy-terminated reactive polymer O with 100 parts of DGEBA liquid epoxy in the presence of 40 parts of tabular alumina, 3.5 parts of fumed silica, 2 parts of 3-phenyl-1,1-dimethyl urea, and 6 parts of latent curing agent dicyandiamide. Each recipe then was cured for one hour at 170° C. on both cold-rolled steel and electrogalvanized steel to form a cured modified epoxy resin system. Table XIV lists the adhesive properties of each cured modified epoxy resin system on both substrates.

TABLE XIV

| RECIPES | 47 | 48 |
|---|---|---|
| DGEBA Liquid Epoxy | 100 | 100 |
| Tabular Alumina | 40 | 40 |
| Polymer O (16% Acrylonitrile) | 10 | 15 |
| Fumed Silica | 3.5 | 3.5 |
| Dicyandiamide | 6 | 6 |
| 3-phenyl-1,1-dimethyl urea | 2 | 2 |
| Adhesive Properties - CRS | | |
| Lap Shear, psi | 1503 | 1526 |
| T-Peel, pli | 25.3 | 26.3 |
| Tg Cured Adhesive, °C. | 128 | 127 |
| Adhesive Properties - EGS | | |
| Lap Shear, psi | 1309 | 1316 |
| T-Peel, pli | 21.8 | 22.7 |
| Tg Cured Adhesive, °C. | 128 | 127 |

The results show that varying the amount of the reaction product statistical monofunctional epoxy-terminated polymer O generally has a negligible effect on the adhesive properties of the cured modified epoxy resin system, such as lap shear, T-peel, and the glass transition temperature both on cold-rolled steel and electrogalvanized steel substrates.

EXAMPLE 37

Recipes 49 and 50 set forth below in Table XV were prepared by reacting 25 parts and 37.5 parts, respectively, of the statistical difunctional epoxy-terminated reactive polymer i with 92.5 parts and 77.5 parts of DGEBA liquid epoxy in the presence of 40 parts of tabular alumina, 3.5 parts of Cab-O-Sil, 2 parts of Omicure 94, and 6 parts of latent curing agent dicyandiamide. Recipes 51 and 52 were prepared by reacting a blended product statistical monofunctional epoxy-terminated polymer comprising, respectively, 12.5 parts of difunctional polymer i blended with 5 parts of the non-functional polymer and 18.7 parts of difunctional polymer i blended with 7.5 parts of the non-functional polymer, with 92.5 and 88.8 parts of DEGBA liquid epoxy in the presence of 40 parts of tabular alumina, 3.5 parts of Cab-O-Sil, 2 parts of Omicure 94, and 6 parts of dicyandiamide. Each recipe was then cured for 1 hour at 170° C. on both cold-rolled steel and electrogalvanized steel to form a cured modified epoxy resin system. Table XV lists the adhesive properties of each cured modified epoxy resin system on both substrates.

TABLE XV

| RECIPES | 49 | 50 | 51 | 52 |
|---|---|---|---|---|
| DEGBA Liquid Epoxy | 92.5 | 77.5 | 92.5 | 88.8 |
| Tabular Alumina | 40 | 40 | 40 | 40 |
| Difunctional Epoxy-Terminated Polymer i (16% Acrylonitrile) | 25 | 37.5 | 12.5 | 18.7 |
| Non-functional Polymer (16% Acrylonitrile) | 0 | 0 | 5 | 7.5 |
| Cab-O-Sil | 3.5 | 3.5 | 3.5 | 3.5 |
| Dicyandiamide | 6 | 6 | 6 | 6 |
| Omicure 94 | 2 | 2 | 2 | 2 |
| ADHESIVE PROPERTIES - CRS | | | | |
| Lap Shear, psi | 1359 | 1486 | 1333 | 1220 |
| T-peel, pli | 23.6 | 30.1 | 23.5 | 24.6 |
| ADHESIVE PROPERTIES - EGS | | | | |
| Lap Shear, psi | 1392 | 1527 | 1374 | 1427 |
| T-Peel, pli | 30.7 | 31.2 | 27.4 | 27.6 |

The results show that the blended product statistical monofunctional epoxy-terminated polymer gives comparable adhesive properties when used to modify an epoxy in accordance with recipes 51 and 52, to a difunctional polymer i used to modify an epoxy resin system in accordance with recipes 49 and 50.

EXAMPLE 38

Recipes 53 and 54 shown below in Table XVI were prepared by reacting 25 and 37.5 parts, respectively, of the statistical difunctional epoxy-terminated reactive polymer n with 92.5 and 77.5 parts of DGEBA liquid epoxy in the presence of 40 parts of tabular alumina, 3.5 parts of Cab-0-Sil, 2 parts of Omicure 94, and 6 parts of latent curing agent dicyandiamide. Recipes 55 and 56 were prepared by reacting a blended product statistical monofunctional epoxy-terminated polymer comprising, respectively, 12.5 parts of difunctional polymer n mixed with 5 parts of non-functional polymer, and 18.7 parts of difunctional polymer n mixed with 7.5 parts of the non-functional polymer, with 92.5 and 88.8 parts of DGEBA liquid epoxy in the presence of 40 parts of tabular alumina, 3.5 parts of Cab-0-Sil, 2 parts of Omicure 94, and 6 parts of dicyandiamide. Each recipe then was cured for 1 hour at 170° C. on both cold-rolled steel and electrogalvanized steel to form a cured modified epoxy resin system. Table XVI lists the adhesive properties of each cured modified epoxy resin system on both substrates.

TABLE XVI

| RECIPES | 53 | 54 | 55 | 56 |
|---|---|---|---|---|
| DEGBA Liquid Epoxy | 92.5 | 77.5 | 92.5 | 88.8 |
| Tabular Alumina | 40 | 40 | 40 | 40 |
| Difunctional Epoxy-Terminated Polymer n (26% Acrylonitrile) | 25 | 37.5 | 12.5 | 18.7 |
| Non-functional Polymer (26% Acrylonitrile) | 0 | 0 | 5 | 7.5 |
| Cab-O-Sil | 3.5 | 3.5 | 3.5 | 3.5 |
| Dicyandiamide | 6 | 6 | 6 | 6 |
| Omicure 94 | 2 | 2 | 2 | 2 |
| ADHESIVE PROPERTIES | | | | |
| Lap Shear, psi | 1541 | 1544 | 1202 | 1240 |
| T-Peel, pli | 28.0 | 31.0 | 16.7 | 20.3 |
| ADHESIVE PROPERTIES | | | | |
| Lap Shear, psi | 1406 | 1596 | 1182 | 1186 |
| T-Peel, pli | 31.4 | 30.4 | 23.1 | 23.0 |

The results show that the epoxy resin system modified with the blended product statistical monofunctional epoxy-terminated polymer containing 26 percent acrylonitrile per recipes 55 and 56 generally gives better adhesive properties on both cold-rolled steel and electro galvanized steel than the control of Example 33 in Table XI, but does not give as good adhesive properties as does a cured epoxy resin system modified with the blended product statistical monofunctional epoxy-terminated polymer containing 16 percent acrylonitrile of Example 37 and Table XV above, or as good as the system modified merely with the difunctional polymer per recipes 53 and 54 of Table XVI above.

If desired, fillers can be included in the recipe for producing the modified epoxy resin systems of the present invention. Such fillers include clays, silicon, calcium carbonate, aluminum oxides, mica, talc, and titanium dioxides, in amounts generally from about 0 to about 150 parts. In addition, thixotropic agents such as Cab-O-Sil ® in amounts of from about 0 to about 5 parts can also be incorporated into the polymer to prevent sag.

As discussed above, the epoxy resins of the present invention as modified by the low viscosity statistical monofunctional reactive liquid polymers, are low viscosity pre-cure compositions which retain desirable post-cure physical properties as compared with the higher viscosity toughened pre-cure epoxy resin compositions which are modified with difunctional polymers. More particularly, the relatively viscous pre-cured functionally modified epoxy resin compositions typically require warming to reduce their viscosity and render them more workable, especially in the field. In contrast, the present inventive pre-cure low viscosity modified epoxy resin compositions do not require warming prior to use and will be preferred for applications which must be performed at relatively low or ambient temperatures. Additionally, the present pre-cure low viscosity modified epoxy resin adhesive are useful as sealants, film or paste structural adhesives, and for various applications in the aircraft and auto industries.

While in accordance with the Patent Statutes, the best mode and preferred embodiments have been set forth, the scope of the invention is not limited thereto, but rather by the scope of the attached claims.

What is claimed is:

1. A low viscosity statistical monofunctional terminated liquid polymer product, comprising:
a blend of a difunctional terminated polymer selected from the group consisting of carboxyl-terminated, amine-terminated and epoxy-terminated polymers and a non-functional terminated polymer wherein from about 0.2 to about 90 percent of said difunctional polymer and from about 10 to about 99.8 percent of said non-functional polymer are blended, so that said statistical monofunctional terminated polymer has a functionality of from about 0.004 to about 1.8, and wherein each polymer has a backbone consisting essentially of carbon-carbon linkages.

2. The polymer product of claim 1, wherein from about 30 to about 75 percent of said difunctional polymer and from about 70 to about 25 percent of said non-functional polymer are blended, so that said statistical monofunctional terminated polymer product has a functionality of from about 0.6 to about 1.5.

3. The polymer product of claim 2, wherein from about 60 to about 40 percent of said difunctional polymer and from about 40 to about 60 percent of said non-functional polymer are blended, so that said statistical monofunctional terminated polymer has a functionality of from about 0.8 to about 1.2.

4. The polymer product of claim 3, wherein about 50 percent of said difunctional polymer and about 50 percent of said non-functional polymer are blended, so that said statistical monofunctional terminated polymer has a functionality of about 1.0.

5. A process for providing a low viscosity statistical monofunctional terminated liquid polymer product, comprising the steps of:
blending a difunctional terminated polymer with a non-functional terminated polymer at a temperature of from about 40° C. to about 120° C.

6. The process of claim 5, wherein said difunctional terminated polymer is carboxyl-terminated, amine-terminated or epoxy-terminated; wherein from about 0.2 to about 90 percent of said difunctional polymer and from about 10 to about 99.8 percent of said non-functional polymer are blended, so that said statistical monofunctional terminated polymer has a functionality of from about 0.004 to about 1.8.

7. The process of claim 6, wherein from about 30 to about 75 percent of said difunctional polymer and from about 70 to about 25 percent of said non-functional polymer are blended, so that said statistical monofunctional terminated polymer has a functionality of from about 0.6 to about 1 5; and wherein said difunctional and non-functional polymers are blended at a temperature of from about 50° C. to about 90° C.

8. The process of claim 7, wherein from about 60 to about 40 percent of said difunctional polymer and from about 40 to about 60 percent of said non-functional polymer are blended, so that said statistical monofunctional terminated polymer has a functionality of from about 0.8 to about 1.2.

9. The process claim 8, wherein about 50 percent of said difunctional polymer and about 50 percent of said non-functional polymer are blended, so that said statistical monofunctional terminated polymer has a functionality of about 10; and wherein said difunctional and nonfunctional polymers are blended at a temperature of from about 50° C. to about 60° C.

* * * * *

UNITED STATES PATENT AND TRADEMARK OFFICE
CERTIFICATE OF CORRECTION

PATENT NO. : 5,280,068

DATED : Jan. 18, 1994

INVENTOR(S) : Alan R. Siebert and Robert J. Bertsch

It is certified that error appears in the above-identified patent and that said Letters Patent is hereby corrected as shown below:

COLUMN 46:
In Claim 7, line 39, change "1 5" to read --1.5--.

In Claim 9, line 52, change "10" to read --1.0--.

Signed and Sealed this

Eleventh Day of June, 1996

Attest:

BRUCE LEHMAN

Attesting Officer     *Commissioner of Patents and Trademarks*